US006339745B1

(12) United States Patent
Novik

(10) Patent No.: US 6,339,745 B1
(45) Date of Patent: Jan. 15, 2002

(54) SYSTEM AND METHOD FOR FLEET TRACKING

(75) Inventor: Yekutiel A. Novik, Hadekel (IL)

(73) Assignee: Integrated Systems Research Corporation, Englewood Cliffs, NJ (US)

( * ) Notice: Subject to any disclaimer, the term of this patent is extended or adjusted under 35 U.S.C. 154(b) by 0 days.

(21) Appl. No.: 09/417,163

(22) Filed: Oct. 12, 1999

Related U.S. Application Data

(63) Continuation-in-part of application No. 09/170,471, filed on Oct. 13, 1998, now abandoned.

(51) Int. Cl.[7] ............................ G01C 21/00; G01S 5/04

(52) U.S. Cl. ................... 701/208; 342/357.07; 701/213

(58) Field of Search ................................ 701/208, 213, 701/117; 342/357.1, 386, 357.07; 340/990, 992, 991, 993

(56) References Cited

U.S. PATENT DOCUMENTS

| | | | | |
|---|---|---|---|---|
| 5,122,959 A | * | 6/1992 | Nathanson et al. | 340/993 |
| 5,289,369 A | * | 2/1994 | Hirshberg | 340/992 |
| 5,428,546 A | | 6/1995 | Shah et al. | 364/449 |
| 5,497,149 A | | 3/1996 | Fast | 340/988 |
| 5,548,822 A | | 8/1996 | Yogo | 455/68 |
| 5,557,254 A | * | 9/1996 | Johnson et al. | 342/386 |
| 5,594,650 A | | 1/1997 | Shah et al. | 364/449.1 |
| 5,636,122 A | | 6/1997 | Shah et al. | 364/449.1 |
| 5,758,313 A | | 5/1998 | Shah et al. | 701/208 |
| 5,904,727 A | | 5/1999 | Prabhakaran | 701/208 |
| 5,959,577 A | | 9/1999 | Fan et al. | 342/357 |
| 6,023,653 A | | 2/2000 | Ichimura et al. | 701/208 |
| 6,026,345 A | | 2/2000 | Shah et al. | 701/117 |

FOREIGN PATENT DOCUMENTS

| | | | |
|---|---|---|---|
| EP | 0 604 404 A2 | 12/1990 | G01C/21/00 |
| EP | 0 745 959 A2 | 12/1996 | G07C/5/08 |
| WO | WO 96/36930 | 11/1996 | G06F/165/00 |

OTHER PUBLICATIONS

Cameron, Max et al, "Intelligent Transportation System Mayday Becomes a Reality", Proc. of the IEEE 1995 National Aerospace and Electronics Conf., May, 1995, pp. 340–347.*

(List continued on next page.)

*Primary Examiner*—Gregory C. Issing
(74) *Attorney, Agent, or Firm*—Roberts Abokhair & Mardula, LLC

(57) ABSTRACT

The present invention is for a system for tracking and graphically displaying the positions of vehicles in a fleet, and interacting with the vehicles from a base station. The vehicles in the fleet are equipped with a G.P.S. receiver and communicate the G.P.S. information to a base station. A receiver at the base station receives the information. A computer system connected to the receiver then uses this information to display the position of the vehicle using mapping and tracking software. The system also includes update software which updates text data in a database, updates the graphical representation of the vehicle, and bidirectionally and dynamically links and integrates the text data with the graphical representation of a vehicle. The text data in the database includes information relating to the vehicle, the driver, the schedule of the fleet as well as information relating to the fleet. A user is able to select a vehicle using a selector, the update software can provide information relating to text data. If the user selects information relating to a vehicle or driver using the selector, the update software provides the graphical representation of the selected vehicle or driver. The system also has several features allowing a dispatcher to cooperate with the driver in delivery and vehicle operation.

82 Claims, 26 Drawing Sheets

SYSTEM OVERVIEW

OTHER PUBLICATIONS

Elkins, Peter J. "Service Management Systems For Public Transport– The German Approach", Colloquium on Vehicle Location and Fleet Management Systems, 1993.*

Dittloff, H.J. et al, "VELOC –A New Kind of Information System", IEEE Plans 1992 500 Years After Columbus—Navigation Challenges of Tomorrow, Mar. 1992, pp. 181–187.*

Reynolds, James C. et al, "GPS–Based Vessel Position Monitoring and Display System", IEEE Aerospace and Electronics Systems Magazine, Jul. 1990, pp. 16–22.*

* cited by examiner

5000

REAL TIME TRACKING

5000

DELIVERY VERIFICATION

5000

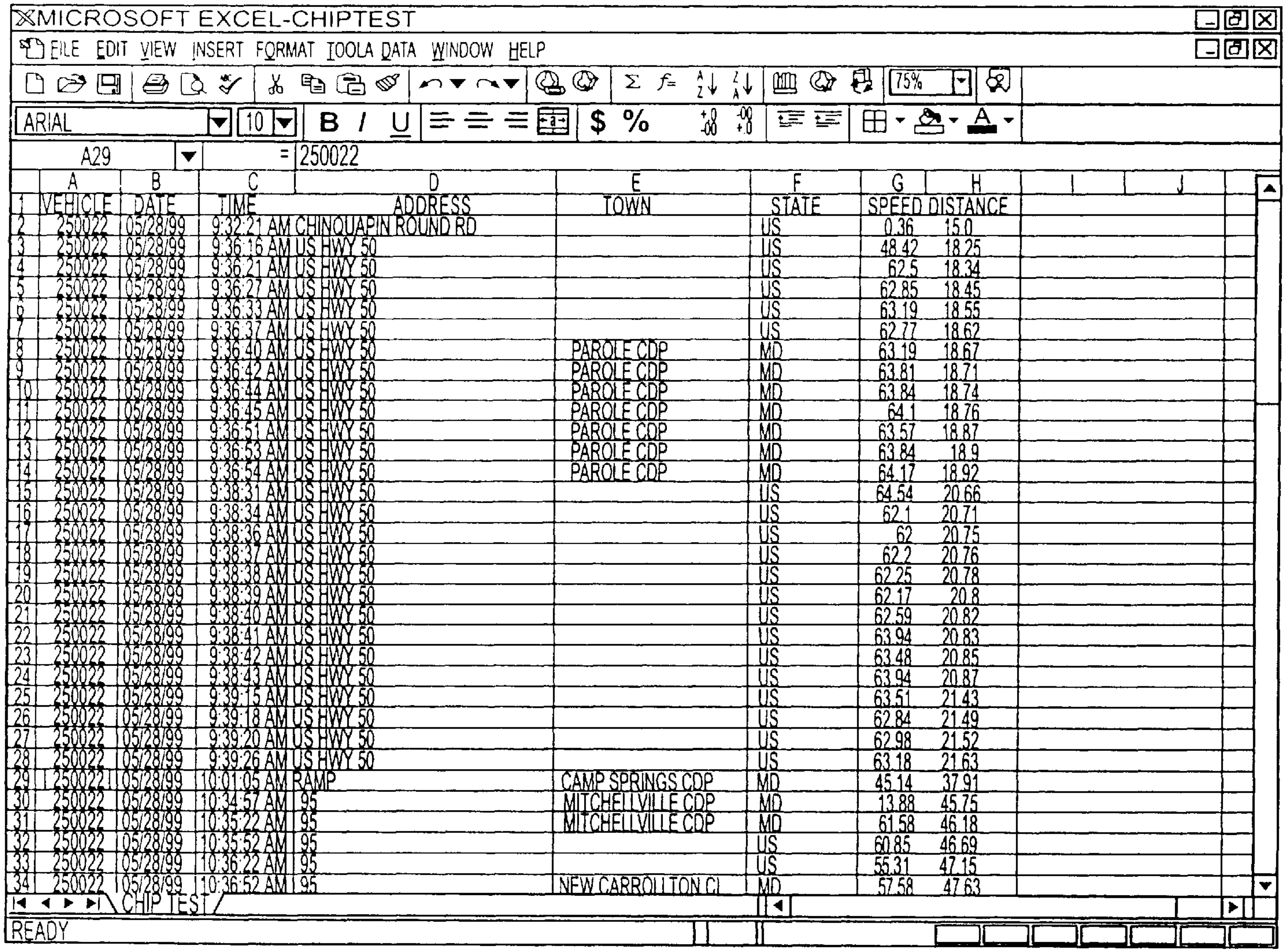

| | A | B | C | D | E | F | G | H | I | J |
|---|---|---|---|---|---|---|---|---|---|---|
| 1 | VEHICLE | DATE | TIME | ADDRESS | TOWN | STATE | SPEED | DISTANCE | | |
| 2 | 250022 | 05/28/99 | 9:32:21 AM | CHINQUAPIN ROUND RD | | US | 0.36 | 15.0 | | |
| 3 | 250022 | 05/28/99 | 9:36:16 AM | US HWY 50 | | US | 48.42 | 18.25 | | |
| 4 | 250022 | 05/28/99 | 9:36:21 AM | US HWY 50 | | US | 62.5 | 18.34 | | |
| 5 | 250022 | 05/28/99 | 9:36:27 AM | US HWY 50 | | US | 62.85 | 18.45 | | |
| 6 | 250022 | 05/28/99 | 9:36:33 AM | US HWY 50 | | US | 63.19 | 18.55 | | |
| 7 | 250022 | 05/28/99 | 9:36:37 AM | US HWY 50 | | US | 62.77 | 18.62 | | |
| 8 | 250022 | 05/28/99 | 9:36:40 AM | US HWY 50 | PAROLE CDP | MD | 63.19 | 18.67 | | |
| 9 | 250022 | 05/28/99 | 9:36:42 AM | US HWY 50 | PAROLE CDP | MD | 63.81 | 18.71 | | |
| 10 | 250022 | 05/28/99 | 9:36:44 AM | US HWY 50 | PAROLE CDP | MD | 63.84 | 18.74 | | |
| 11 | 250022 | 05/28/99 | 9:36:45 AM | US HWY 50 | PAROLE CDP | MD | 64.1 | 18.76 | | |
| 12 | 250022 | 05/28/99 | 9:36:51 AM | US HWY 50 | PAROLE CDP | MD | 63.57 | 18.87 | | |
| 13 | 250022 | 05/28/99 | 9:36:53 AM | US HWY 50 | PAROLE CDP | MD | 63.84 | 18.9 | | |
| 14 | 250022 | 05/28/99 | 9:36:54 AM | US HWY 50 | PAROLE CDP | MD | 64.17 | 18.92 | | |
| 15 | 250022 | 05/28/99 | 9:38:31 AM | US HWY 50 | | US | 64.54 | 20.66 | | |
| 16 | 250022 | 05/28/99 | 9:38:34 AM | US HWY 50 | | US | 62.1 | 20.71 | | |
| 17 | 250022 | 05/28/99 | 9:38:36 AM | US HWY 50 | | US | 62 | 20.75 | | |
| 18 | 250022 | 05/28/99 | 9:38:37 AM | US HWY 50 | | US | 62.2 | 20.76 | | |
| 19 | 250022 | 05/28/99 | 9:38:38 AM | US HWY 50 | | US | 62.25 | 20.78 | | |
| 20 | 250022 | 05/28/99 | 9:38:39 AM | US HWY 50 | | US | 62.17 | 20.8 | | |
| 21 | 250022 | 05/28/99 | 9:38:40 AM | US HWY 50 | | US | 62.59 | 20.82 | | |
| 22 | 250022 | 05/28/99 | 9:38:41 AM | US HWY 50 | | US | 63.94 | 20.83 | | |
| 23 | 250022 | 05/28/99 | 9:38:42 AM | US HWY 50 | | US | 63.48 | 20.85 | | |
| 24 | 250022 | 05/28/99 | 9:38:43 AM | US HWY 50 | | US | 63.94 | 20.87 | | |
| 25 | 250022 | 05/28/99 | 9:39:15 AM | US HWY 50 | | US | 63.51 | 21.43 | | |
| 26 | 250022 | 05/28/99 | 9:39:18 AM | US HWY 50 | | US | 62.84 | 21.49 | | |
| 27 | 250022 | 05/28/99 | 9:39:20 AM | US HWY 50 | | US | 62.98 | 21.52 | | |
| 28 | 250022 | 05/28/99 | 9:39:26 AM | US HWY 50 | | US | 63.18 | 21.63 | | |
| 29 | 250022 | 05/28/99 | 10:01:05 AM | RAMP | CAMP SPRINGS CDP | MD | 45.14 | 37.91 | | |
| 30 | 250022 | 05/28/99 | 10:34:57 AM | 95 | MITCHELLVILLE CDP | MD | 13.88 | 45.75 | | |
| 31 | 250022 | 05/28/99 | 10:35:22 AM | 95 | MITCHELLVILLE CDP | MD | 61.58 | 46.18 | | |
| 32 | 250022 | 05/28/99 | 10:35:52 AM | 95 | | US | 60.85 | 46.69 | | |
| 33 | 250022 | 05/28/99 | 10:36:22 AM | 95 | | US | 55.31 | 47.15 | | |
| 34 | 250022 | 05/28/99 | 10:36:52 AM | 95 | NEW CARROLLTON CI | MD | 57.58 | 47.63 | | |

FIG. 23

HISTORY PLAYBACK

FIG. 25
REMOTE VEHICLE SENSORS - I/O
ISR FLEET TRACK D 5.09
Screen Map Go To Tracks Overlays Routes Configure Network FleetManagement GeoQuery Help
OUTPUT SWITCHES
SWITCHES LIST
OUTPUT 1
OUTPUT 2
OUTPUT 3
SEND
CANCEL
ALL
100481
15
15020
150236
151447
200769
22
234
250022
250033
250046
250086
300047
4369
4425
4426
4438
4449
4465
4531
4559
4578
4558
4598
4605
507
ED
150207
ARBUTUS
LANDSDOWNE-BALTIMORE HIGHLA
1 MILES
5 MILES
NETWORK
SD RD
Miles Across map: 4.41
39°14'46.15"34"N76°39'24 13"W->2482SARATOGA AVE, LANSDOWNE BALTIMORE HIGHLANDS CDP, MD

SYSTEM AND METHOD FOR FLEET TRACKING

RELATIONSHIP TO OTHER INVENTIONS

Continuation in Part from application Ser. No. 09/170,471 filed Oct. 13, 1998, now abandoned.

FIELD OF THE INVENTION

This invention relates generally to Global Positioning System (GPS) tracking software which allows the user of the software to display text data on the computer system. More particularly, the present invention relates to bi-directionally and dynamically linking and integrating the text data, graphical display, and interactive communication functions of the tracking software.

BACKGROUND

Tracking and knowing the position of a vehicle can be very useful to a company. By knowing the location of every vehicle in a fleet, a company can utilize the vehicles in a more efficient and effective manner. For instance, if a company knows a delivery vehicle's position, the company can estimate delivery times more accurately, determine the best routes, inform the driver of traffic conditions, and the like. For taxi services, the service can dispatch the closest, available vehicle to pick up a fare. For courier services, services can increase their efficiency by reducing the number of times a courier has to make repetitive trips to an area where the courier has already frequented.

To track a vehicle, the positions of the vehicle over a period of time needs to be known. The Global Positioning System (GPS) is a popular means to determine the position of a vehicle having a GPS receiver. GPS can determine the position of a vehicle which is on land, at sea, or in the air. The GPS information is typically communicated to positional software embedded in a GPS receiver. When connected to tracking software, the system processes the GPS information, obtains a background map from a geographical information system (GIS), and displays the position of the vehicle on the selected background map. By providing the GPS information of more than one vehicle, the computer system can track a plurality of vehicles, such as a fleet of vehicles.

Integrating interactive communications between the vehicle and the base station can also be useful to a company. With interactive communications, a driver could be given alternate routes or a corrected destination. Interactive communications could also avoid safety and security concerns. For instance, where keys were locked in the vehicle a remote user could unlock the door if interactive communications were provided. Additionally, where a vehicle's brakes malfunction or the car is stolen, were interactive communications available, a remote user could kill the ignition. If interactive communications were available, vehicles could be sent on new jobs without having to return to a base. If interactive communications were available, drivers could conduct transactions from within the vehicle.

Although prior inventions have used tracking software on computer systems to track and display the positions of a plurality of vehicles, the prior inventions have not taken full advantage of other capabilities for data integration that exists in computer systems. The prior GPS inventions, in general, only provide a limited amount of information to the user of the system. Prior inventions fail to provide text data that includes information such as fleet schedule, vehicle information, driver information, permits, and the like. Prior inventions fail to use GPS information integrated with interactive communication to change vehicle operations. By bi-directionally linking and integrating the text data and the graphical display of the tracking software, the user of the software is able to go back and forth between the text data and graphical display. For instance, if the user is tracking a specific vehicle by viewing a graphic representation of the vehicle on a map, the user can obtain the text data relating to that vehicle by simply "clicking" on that graphic representation. In addition, by incorporating this additional information into an integrated GPS based vehicle tracking system, the information can be processed to provide operating costs and driver evaluations to the user, assist in the recovery of stolen vehicles, to name but a few applications.

Therefore there is a need for tracking software which bi-directionally links and integrates a wide variety of text data, graphical display, and interactive communication functions of tracking software.

SUMMARY OF THE INVENTION

It is an object of the present invention to allow a user to monitor at least one vehicle.

A further object of the present invention is to allow a user to monitor the position of a fleet of vehicles.

A further object of the present invention is to allow a user to monitor and/or reconstruct the speed of vehicles in a fleet.

A further object of the present invention is to cascade monitor displays for simultaneous viewing of a fleet and specific vehicle operations.

A further object of the present invention is to cascade system displays and business reports for simultaneous display.

A further object of the present invention is to alert a user to abnormalities in fleet operations.

A further object of the present invention is to alert a user to problems with use of a vehicle.

A further object of the present invention is to provide independent verification of a delivery site.

A further object of the present invention is to remotely control vehicle functions by a user.

Yet another object of the present invention is to locate the closest vehicle within a fleet to a response site.

A further object of the present invention is to integrate monitored parameters with business report formats.

A further object of the present invention is to improve customer response times for delivery of goods by a fleet of vehicles.

A further object of the present invention is to provide automatic signal switching to prevent data drop-outs between a user and a vehicle.

A further object of the present invention is to provide indications of data drop-outs in transmissions between a user and a vehicle.

A further object of the present invention is to integrate peripheral operations between a vehicle and a user.

A further object of the present invention is to lower the costs of operating a vehicle or a fleet of vehicles.

A further object of the present invention is to lower the costs of insurance for a vehicle or a fleet of vehicles.

A further object of the present invention is to allow a user to evaluate a driver's performance.

A further object of the present invention is to protect a vehicle from being stolen.

A further object of the present invention is the ability to warn a driver about the weather, road conditions, and the like.

A further object of the present invention is the ability to allow a driver to report an emergency.

The present invention comprises a specific suite of hardware that integrates text data and GPS position information and tracking software to permit a user to better manage and report on a fleet of vehicles. The present invention bi-directionally and dynamically links and integrates the text, data, and the information on vehicles in a fleet. A user is not only able to track and display the position of at least one vehicle, but also to store text data in a database and to provide text data containing additional information about the vehicle or vehicles being tracked to the user. The additional information includes text data about the vehicles, drivers, schedules, permits, and the like. The additional information can be processed to provide operating costs and driver evaluations to the user, assist in the recovery of stolen vehicles, and the like. Further, the present invention allows a user to manage fleet operations, including providing route, delivery and weather information to drivers. The present invention further provides remote control of vehicle functions for maintaining fleet safety and security.

BRIEF DESCRIPTION OF THE FIGURES

FIG. 23 is an example of a screen displaying the integrated report feature for a specific operating system.

DETAILED DESCRIPTION OF THE INVENTION

Figure 1:
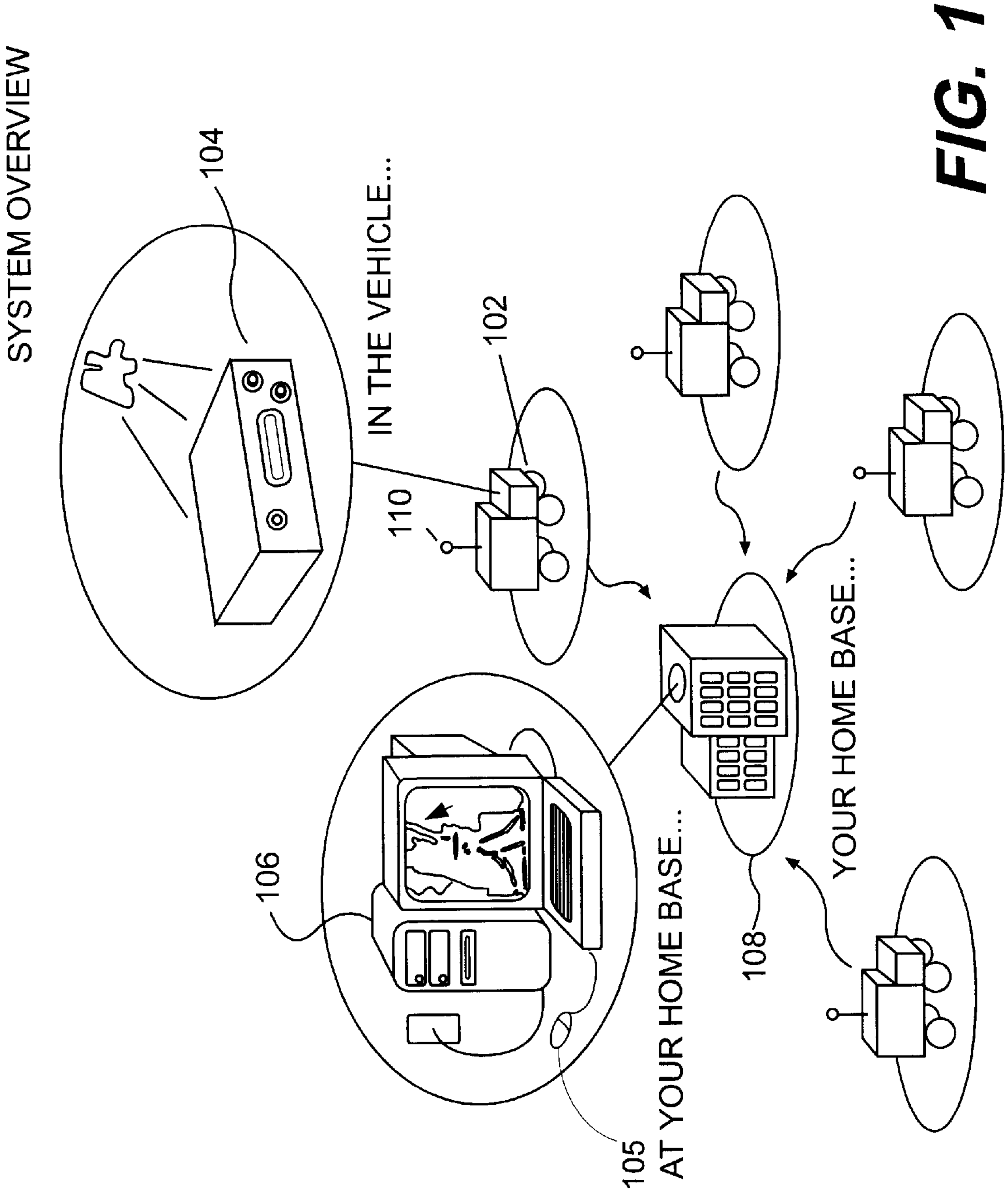
FIG. 1 is an overview of a vehicle tracking system.

Referring to FIG. 1, an overview of a vehicle tracking system is illustrated. In order to determine the position of vehicle 102, GPS technology is utilized. GPS is a space based triangulation system that uses satellites and computers to measure positions anywhere on earth. Three satellites are used in conjunction with GPS technology to provide the position of vehicle 102. When activated, GPS technology provides the position of GPS receiver 104 which is mounted on or within vehicle 102.

GPS receiver 104 can be implemented in a variety of applications including data collector, self-tracking, or remote sensing. As a data collector, G.P.S. receiver 104 receives and records the G.P.S. information for vehicle 102. Each position of G.P.S. receiver 104 is logged with a date and time stamp. Later, the G.P.S. information is downloaded to computer system 106 which is located at base station 108. Computer system 106 allows a user to replay the path or route that vehicle 102 traveled.

As a self-tracking unit, G.P.S. receiver 102 is connected to an on board computer system which is located within vehicle 102. The G.P.S. information is communicated via communicator 110 from G.P.S. receiver 104 to computer system 106. Communicator 110 is located on or within vehicle 102. The on board computer system receives, records, processes, and displays the information.

In the preferred embodiment, G.P.S. receiver 104 communicates the G.P.S. information to base station 112 using communicator 110. More specifically, communicator 110 communicates the G.P.S. information from G.P.S. receiver 104 to computer system 106 which is located at base station 108. Communicator 110 is located on or within vehicle 102. In the preferred embodiment, communicator 110 is a transceiver, thereby allowing the vehicle and base station to transmit and receive messages. Computer system 106 receives, records, processes, and displays the information.

Communicator 110 uses communication means which include but is not limited to radio, cellular, digital radio (such as Mobitex), or satellite communication means. In an alternate embodiment, base station 108 receives the G.P.S. information over the Internet. Communication means 110 transmits the G.P.S. information to a wireless network, which transmits the G.P.S. information to the wireless network's headquarters which then transmits the G.P.S. information over the Internet to base station 108.

The software of the present invention, which is referred to as update software, interacts with mapping and tracking software. In the preferred embodiment, the present invention is used with ISR FleetTrack™ for Windows. In an alternate embodiment, the present invention is used with NavTrack™ for DOS. ISR FleetTrack™ and NavTrack™ are mapping and tracking programs developed by Integrated Systems Research Corporation of 140 Sylvan Avenue, Englewood Cliffs, N.J. USA. The update software requires a Pentium™ based processor having storage capabilities and run Windows 95/98/NT or an equivalent. The system also requires digital maps which can be scanned by the user or provided by a third party.

In an alternate embodiment, a recorder records the G.P.S. information. If a recorder is used to record the G.P.S. information, then the G.P.S. information must be communicated to the computer system for processing. Any communication means known to one skilled in the art can be used to communicate the G.P.S. information to the computer system. As for displaying the G.P.S. information, a display means is required. The display means includes, but is not limited to the following: liquid crystal display (LCD), computer screen, printouts, and the like.

To display the information, the update software overlays an icon representing the vehicle on a background map. If more than one vehicle is being tracked, then each vehicle is represented by a unique icon. The icon is located on the background map according to the geographical coordinates from the G.P.S. information. The background maps can be maps from the GIS, registered photographs, scanned photographs, or from some other geographically accurate scanned map source. The background maps include but are not limited to digital maps, raster scanned maps, aerial photographs, and the like. The maps are described in further detail below.

Using the update software, a user can manipulate the maps to observe different areas, vehicles, landmarks, and other features. For example, the user can search for different locations, pan to different areas on a map, zoom in or out of an area or around a vehicle, replay the track recording of a vehicle, archive automatically and replay on demand, create alert zones, go to specific locations, and other features. The update software not only tracks and displays the vehicles being tracked but also provides text data about the fleet, vehicles, drivers, permits, and other relevant information. The text data is stored in databases. The databases contain information on vehicles, drivers, permits, scheduling, tasks, and messages sent to and from the vehicles.

The update software bi-directionally and dynamically links and integrates the text data and the graphical display of the tracking software. The update software allows the user to switch from text data to the graphical display or from the graphical display to the text data. For example, if the user is tracking a specific vehicle by viewing a graphical representation of the vehicle on a map, the user can obtain text data relating to that vehicle, the driver, the schedule for the vehicle, as well as other information simply by "clicking" a selection means 105, such as a mouse, on that graphical representation. Similarly, if the user is viewing the text data relating to a vehicle, a driver, a schedule for the vehicle, as well as other information, the user can obtain a map illustrating where the vehicle is on the map simply by "clicking" on the displayed feature, i.e., vehicle, driver, schedule, or other feature. Other text data features can be used in a similar manner. The user of the update software is able to enter information on all the vehicles in the fleet, enter information on all of the drivers, link the drivers and vehicles by specifying which drivers are permitted to drive which vehicles, plan an itinerary for each vehicle, obtain the history of each vehicle, obtain information on a displayed track (the information includes messages sent to and from the vehicle, the vehicle's task list, and database information on the vehicle or driver).

In the preferred embodiment, there are two options available to the user at the base station to display text data. One option is the Fleet Management/Schedule Option. This option allows the user to enter vehicle information, enter driver information, assign permits, plan and manage a schedule for the fleet, access driver information, and access vehicle information. A second option is the Track Info Option. This option is to enable the user to track a vehicle. In the preferred embodiment, this option can only be enabled when the map marker (i.e., mouse) is positioned on the track icon.

A screen displaying information relating to the fleet schedule can be displayed. This information is an example of the type of information concerning the fleet schedule and is not meant as a limitation. The fleet schedule option displays the status and itinerary of each and every vehicle in the fleet. The fleet schedule option allows the user to enter vehicle information, enter driver information, assign permits to specify which drivers are permitted to drive which vehicles, and other functions. The user is also permitted to plan and manage a work schedule for a vehicle, a fleet of vehicles, access driver information, and access vehicle information. When the fleet schedule option is utilized, a list of the vehicles with their present drivers as well as a current time stamp is displayed. Any vehicle that is not currently assigned to any driver is listed as "available." The user can also select a vehicle from the list to display the vehicle's schedule. The user can also switch to a map displaying a selected vehicle, a plurality of vehicles, or an entire fleet of vehicles.

Figure 2:
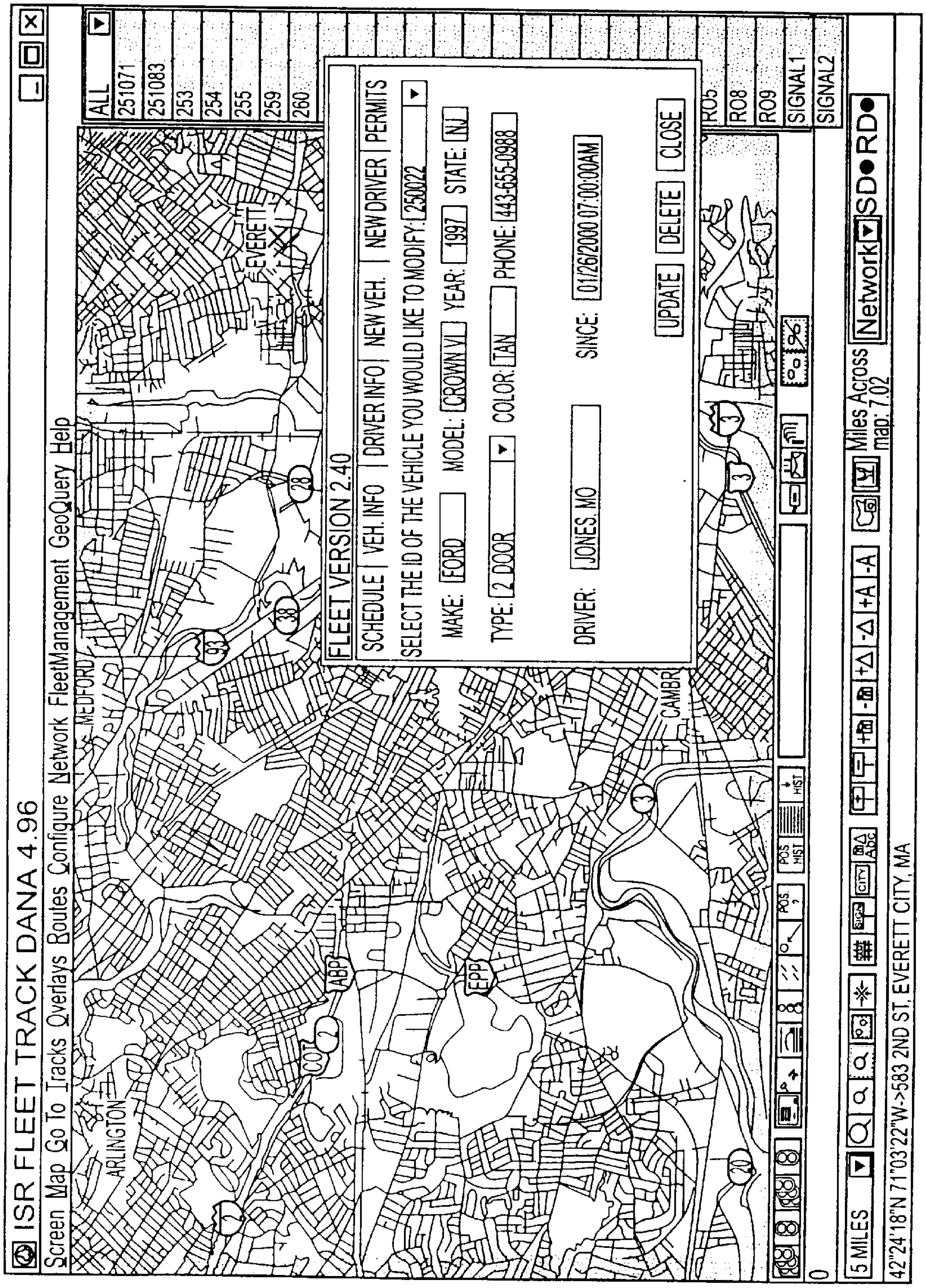
FIG. 2 is an example of a screen displaying information concerning a vehicle.

Referring to FIG. 2, a screen containing information concerning a vehicle is illustrated. This information is an example of the type of information concerning a vehicle that is available and is not meant as a limitation. The vehicle information option displays text data on all of the vehicles in the fleet. The information includes a drop-down list of all the vehicles in the fleet database including, but is not limited to the following fields: vehicle id, make, model, year, state, type, color, phone, driver, and since fields. A driver information link linking the vehicle information is linked to the driver information which is described below.

Vehicle id field 202 is a drop down list of all the vehicles in the fleet database. Make field 204 is the current vehicle's manufacturer. Model field 206 is the current vehicle's model. Year field 208 is the year the vehicle was manufactured. State field 210 is the code of the state in which the vehicle is registered. Type field 212 is a drop-down list containing the vehicle type. Color field 214 is the color of the vehicle. Phone field 216 is the telephone number of the vehicle's cellular phone. If the vehicle does not contain a cellular phone, then the number is the telephone which can be used to reach the operator of the vehicle. Driver field 218 is the driver assigned to the vehicle for the time stamp that currently appears on the screen. Since field 220 is a time stamp for which the current driver was assigned the current vehicle.

Figure 3:
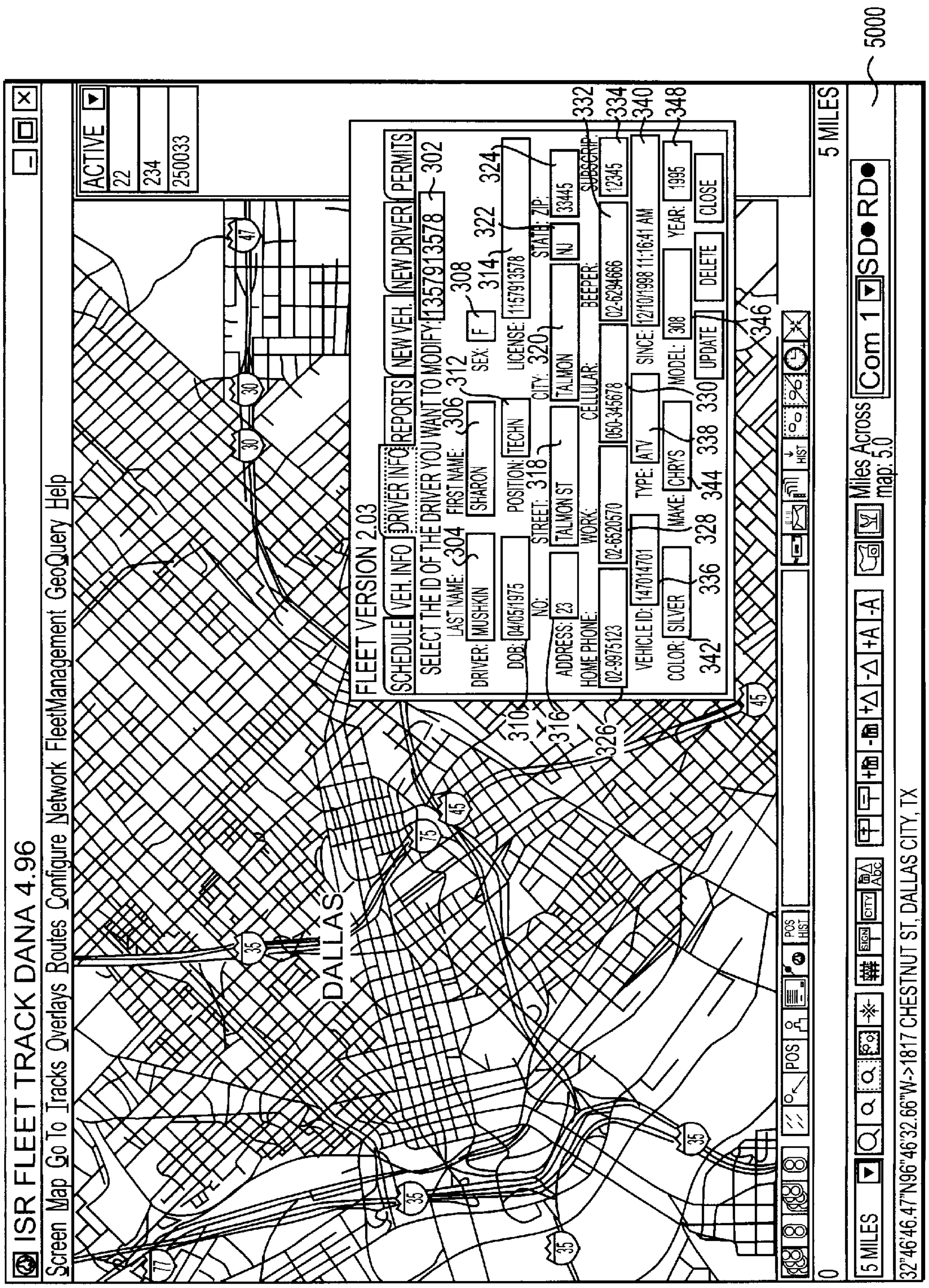
FIG. 3 is an example of a screen displaying information concerning a driver.

Referring to FIG. 3, a screen containing the driver information is illustrated. This information is an example of the type of information concerning the drivers that is available and is not meant as a limitation. The driver information screen is where data on all drivers is viewed and edited. The driver information option includes the following fields: driver id, driver name, sex, DOB, position, license, address number, phones, vehicle id, type, since, color, make, model, and year field. A vehicle information link links the driver information to the vehicle information.

Driver id field 302 is a drop-down list of all drivers in the fleet database. Last name field 304 is the driver's last name and first name field 306 is the driver's first name. Sex field 308 is M for male and F for female. DOB field 310 is the current driver's date of birth. Position field 312 is the driver's position within the company. License field 314 is the driver license number. The address field includes address number field 316, street field 318, city field 320, state field 322, and zip code field 324 of the driver's home address. The phone field is the telephone numbers that the driver can be reached. The phone numbers can include home field 326, work field 328, cellular field 330, beeper field 332, and subscription numbers field 334. Vehicle id field 336 is the id number for the vehicle. Type field 338 is a drop-down list containing the vehicle type. Since field 340 is a time stamp for which the current driver was assigned the current vehicle. Color field 342 is the color of the vehicle. Make field 344 is current vehicle's manufacturer. Model field 346 is the current vehicle's model number. Year field 348 is the year the vehicle was manufactured.

A screen for adding a new vehicle can be displayed as well. The screen includes information concerning a new vehicle. The new vehicle option allows new vehicles to be added to the database. New vehicles can be added at anytime. In the preferred embodiment, the new vehicle option offers a shortcut whereby the user can base the new entry on an existing entry and only change the certain fields. The new vehicle option includes the following fields but is not limited to these fields: vehicle id, make, model, year, state, type, color, phone, vehicle id, and driver id.

The vehicle id field is the identifying name or number given by the user to each vehicle. The make field is the current vehicle's manufacturer. The model field is the current vehicle's model number. The year field is year the vehicle was manufactured. The state field is the code of the state in which the vehicle is registered. The type field is a drop-down list containing the vehicle type. The color field is the color of the vehicle. The phone field is the telephone number of the vehicle's cellular phone. If the vehicle does not contain a cellular phone, then the number is the telephone which can be used to reach the operator of the vehicle. The vehicle field is a drop-down list of vehicles that already exist in the database. The driver id field is a drop-down list of drivers that exist in the database.

A screen showing the new driver option can be displayed. The screen includes information concerning a new driver. The new vehicle option allows new drivers to be added to the database. New drivers can be added at anytime. In the preferred embodiment, the new drivers option offers a shortcut whereby the user can base the new entry on an existing entry and only change certain fields. The new driver option includes the following fields but is not meant as a limitation: driver id, driver name, sex, DOB, position, license, address, phones, driver id.

The driver id field identifies the name or number given by the user to each driver. The driver name field is the driver's first and last name. The sex field is M for male and F for female. The DOB field is the current driver's date of birth. The position field is the driver's position within the company. The license field is the driver license number. The address field is the address number, street, city, state, and zip code of the driver's home address. The phone field is the telephone numbers that the driver can be reached. The phone numbers can include home, work, cellular, beeper, and subscription numbers. The driver id field is a drop-down list of drivers that already exist in the fleet database.

A screen showing the permit option can be displayed. The screen includes information concerning permits. The permit option allows the user to control which drivers may drive which vehicles. In the preferred embodiment, a vehicle that is not permitted to at least one driver is not listed on the vehicle list. The permits option contains the following fields: vehicle id, driver id, and allowed drivers. The vehicle id field is a drop-down list of all vehicles in the fleet database. The driver id field is a drop-down list of all drivers in the fleet database. The allowed drivers field lists the drivers permitted to drive the current vehicle.

In addition to providing text data on the different vehicles, drivers, scheduling, and permits, the software also can provide specific information on a certain driver or vehicle. This information can be used to lower insurance rates, recover stolen vehicles, avoid traffic hazards, control drivers, and other uses.

Figure 4:
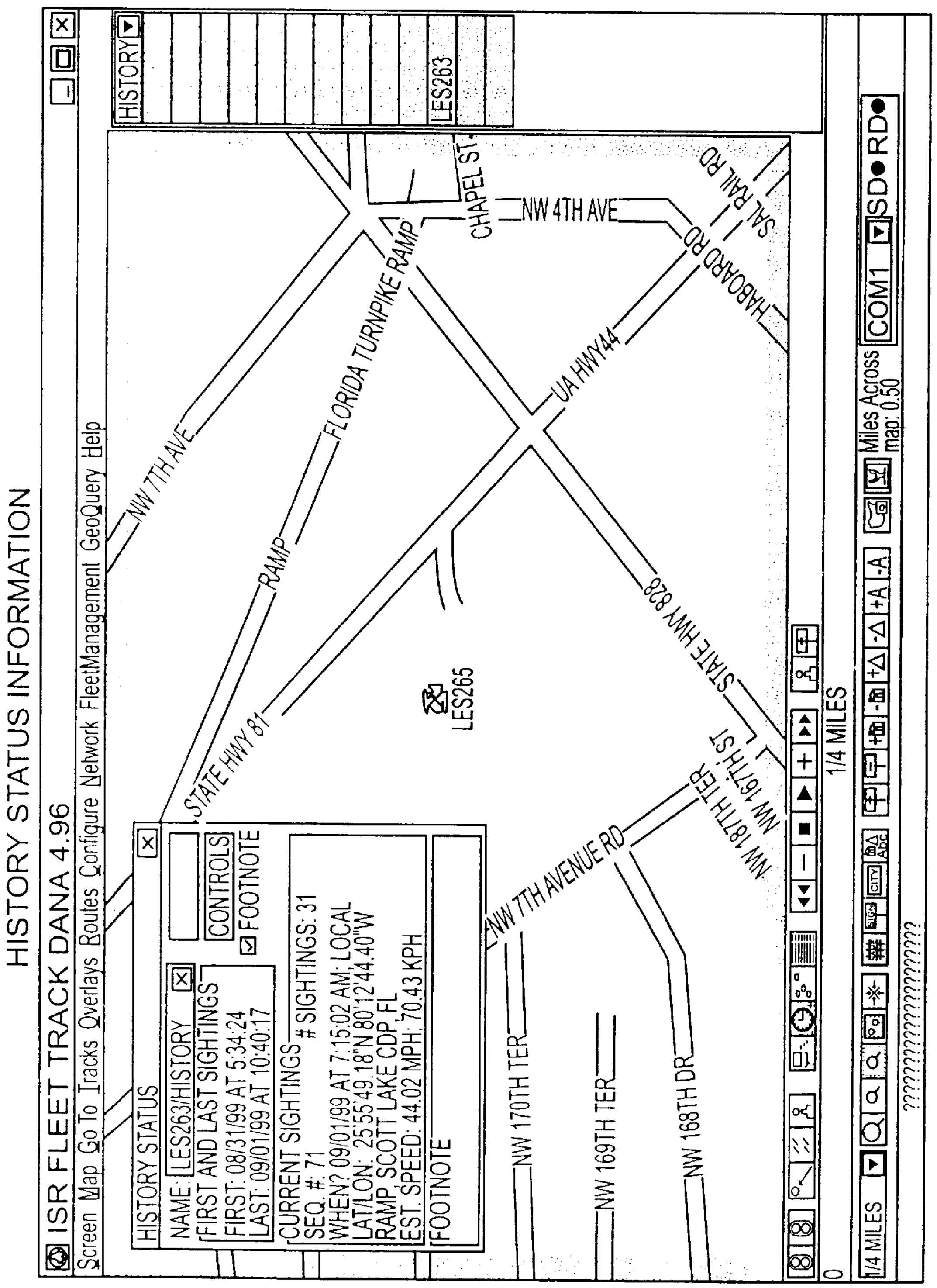
FIG. 4 is an example of a screen displaying the history of a driver.

Referring to FIG. 4, a screen showing the history status for a given driver is illustrated. The screen includes information concerning the status of a driver. The screen includes the following information but is not meant as a limitation: first sighting, the last sighting, the current sighting, the time, the G.P.S. coordinates, the roadway name, estimated speed, and any footnotes are displayed. This information can also be provided to the user as a printout. The system allows for printouts of the different functions. As a result, a printout of the history status for a driver, a plurality of drivers or all the drivers in a fleet can be used as proof to an insurance company the driver or drivers do not speed. Since the speed of the vehicles is a concern or factor in insurance rates, the printouts of the vehicles' speed can be used to lower the insurance premium for a company.

The company can also receive a lower insurance rate because the vehicle is less likely to be stolen for any extended period of time. Since the vehicle is being tracked, the user will know where the vehicle is located. If the vehicle is stolen, the user simply determines where the vehicle is and the proper authorities can be contacted.

Since, the vehicle is being tracked, the company can better control their drivers. For example, the company can be alerted when a vehicle is speeding or detouring from the vehicle's planned route. In the preferred embodiment, when a vehicle exceeds a preset speed limit, an alarm is triggered thereby informing the user. Similarly, an alarm can be triggered to inform the user when a vehicle detours from the vehicle's planned route.

If the vehicle is equipped with a transceiver, the user can exchange messages with the driver of the vehicle. The user will be able to inform the driver of the road conditions, weather conditions, alternate routes, schedule changes, and other important information. The driver of the vehicle can send messages to the user informing the user if the driver needs roadside assistance, traffic conditions, weather conditions, report emergencies, and other important information. An additional benefit of the transceiver is that drivers no longer have to waste time trying to locate a telephone.

The following description describes the different features of the tracking software which runs on the computer system. The following descriptions are examples of the different features of the tracking software and is not meant as a limitation.

A main screen for the tracking software can be displayed. The main screen includes such features as a title bar, menu bar, pan border, map window, map marker, scale bar, toolbar, geo-reference display, as well as other title bars. The title bar displays the title and version number of the current program. The menu bar contains drop-down menus, which offer options that enable the user to execute specific actions which are discussed below. The pan border enables the user to pan the map to different regions. The map window displays the current mapping region. The map marker displays an 'X' at the currently selected point on the map. In the preferred embodiment, the X is a different color (red) than the other map features.

The scale bar enables the user to adjust the map scale. The scale bar discloses the width of the map. In the preferred embodiment, the scale is in kilometers. In an alternate embodiment, the scale is in miles. By adjusting the scale the user is able to zoom in or pan out accordingly. The tool bar contains buttons that give the user quicker access to commonly used commands. Some of the functions in the tool bar include, zoom in, zoom out, zoom area, center map, toggles, add/remove an icon, shape, text, and the like. The Geo-reference display, displays the latitudinal and longitudinal coordinates and exact address or name of the landmark at the maps marker's current location.

Figure 5:
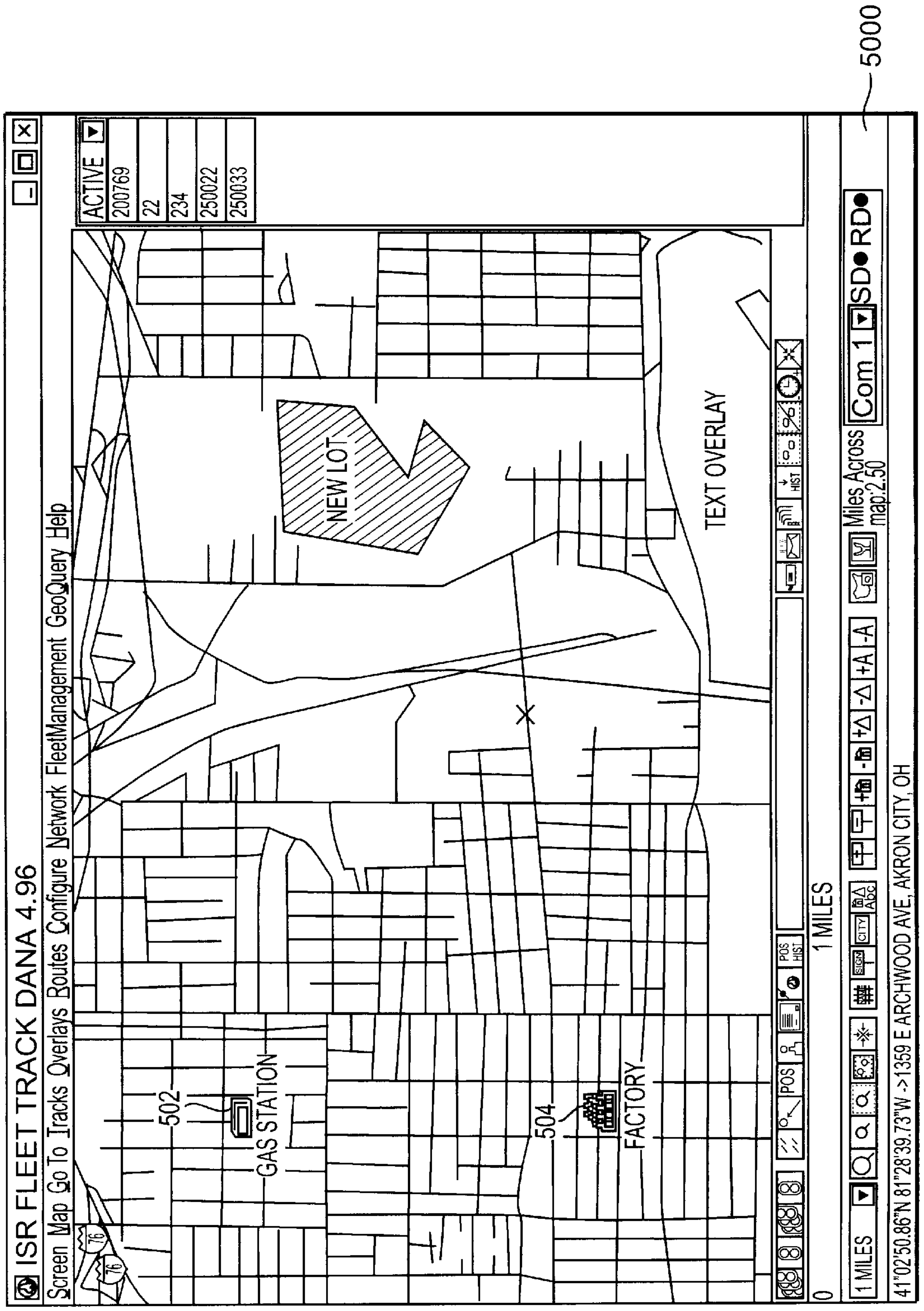
FIG. 5 is an example of an icon and text overlaying on a map.

Referring to FIG. 5, unique icons are assigned to each vehicle. Additional icons can be used to mark different landmarks or locations. The marks can include, zones (described in more detail below), icons, or text. The marks overlay on the map. For instance, gas station icon 502 is identified on the map. Text can be added to the maps to provide additional information. For instance text 504 identifies a speed trap. The icons can take various forms. The user can decide the shape, size, color, and position of the marks. Overlays can be turned on or and off, moved from one spot to another, or saved for future reference.

The map manipulation functions of the present invention allows for one or more vehicles to be tracked across a series of maps. The maps can be panned to allow continuous tracking over the wide area or zoomed to allow more detail concerning a specific area to be viewed. As noted earlier, the capability also exists to register and overlay aerial photographs over maps so that the actual position of the vehicle can be noted with respect to a photographic image. This further aids the user in recognizing the location of the vehicle being tracked.

Figure 6:
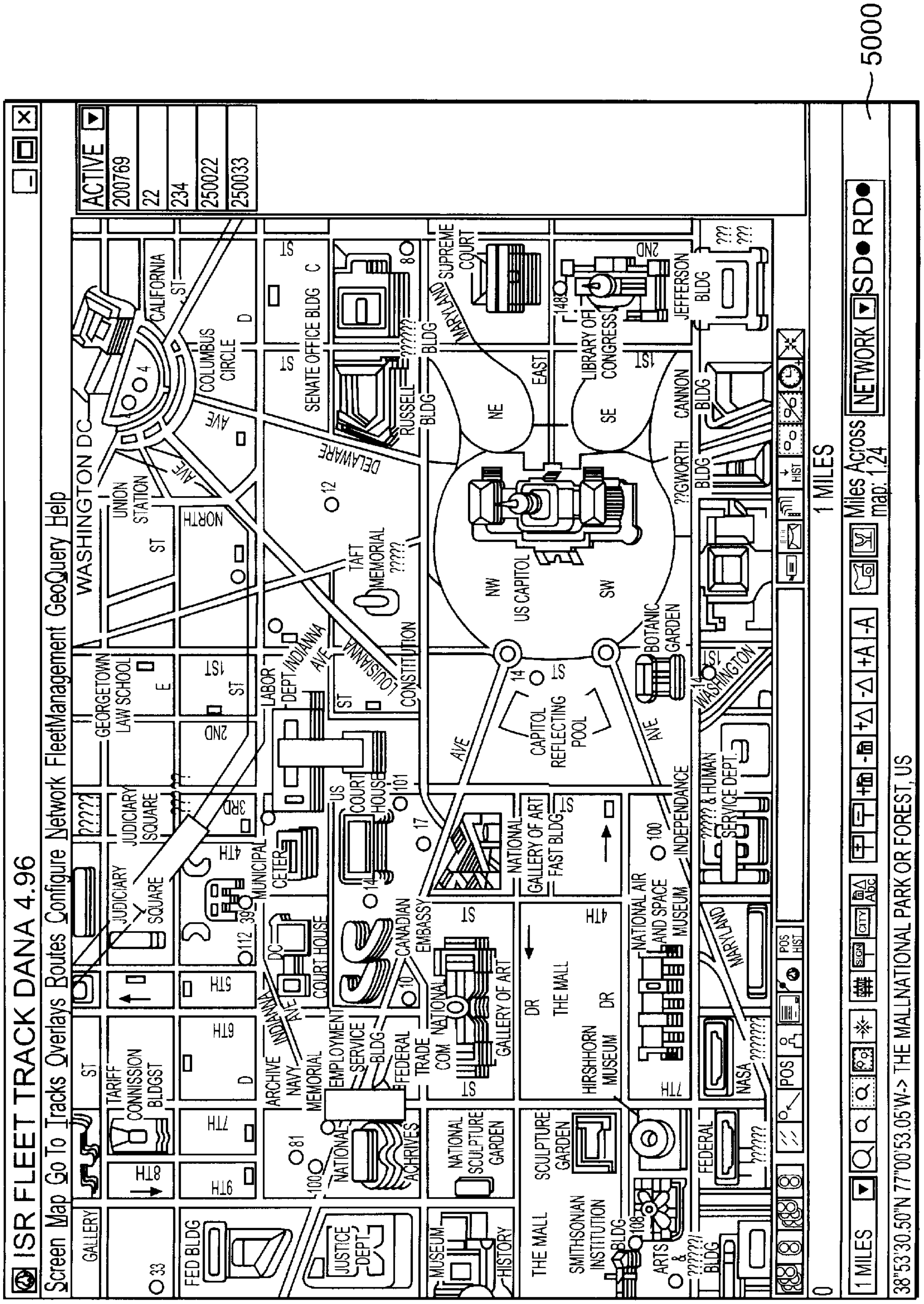
FIG. 6 illustrates a screen displaying a raster scan map overlaying a digital map.

Referring to FIG. 6, a raster scan map overlaying a digital map is illustrated. The raster scan of Washington, D.C. is overlaying a digital map of Washington, D.C. This figure shows the capability of the maps and overlaying functions. It should be noted that the streets are aligned where the two maps meet. For example, Pennsylvania Avenue which is connected to Independence Avenue, starts on the raster scan map and passes through the digital map.

Figure 7:
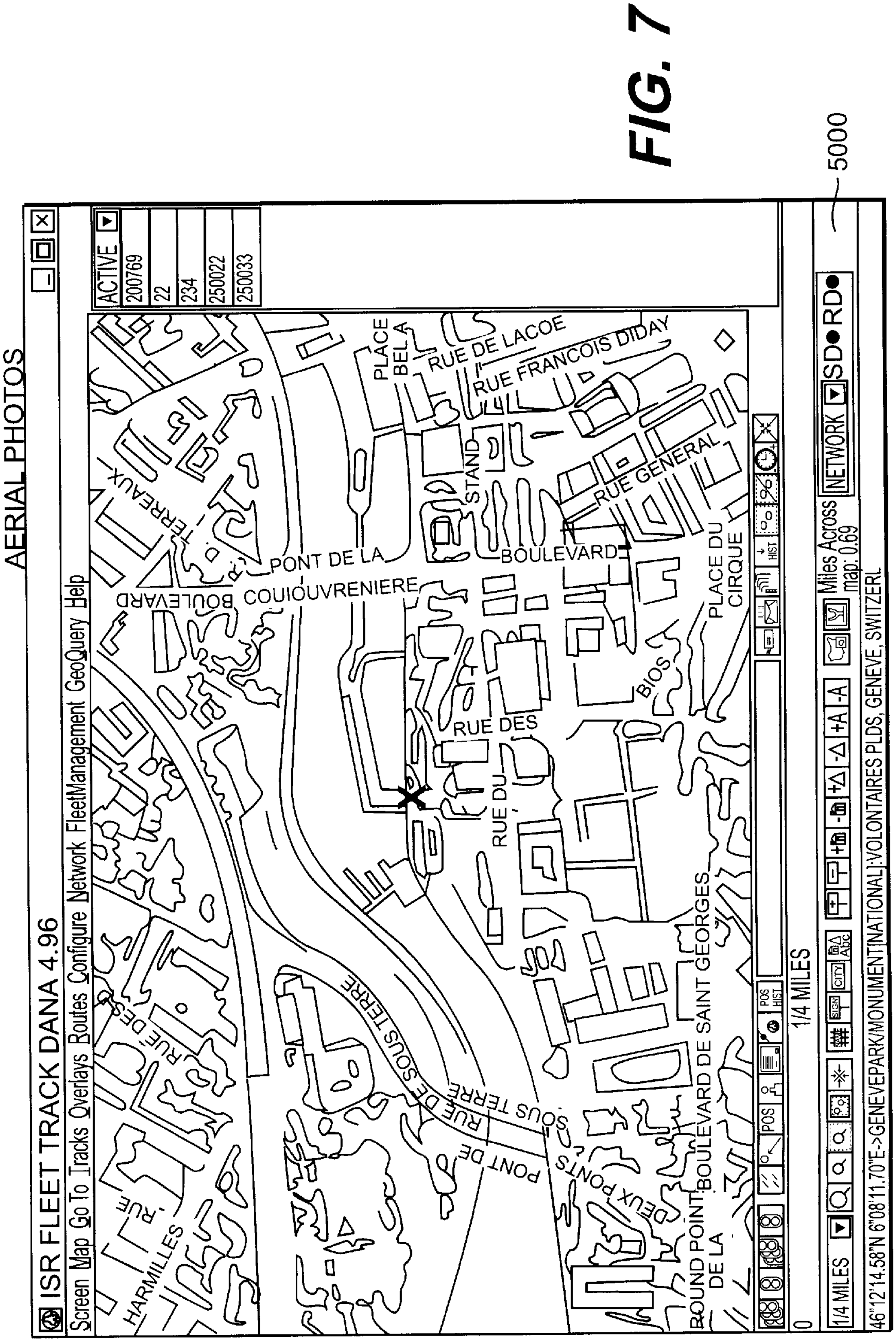
FIG. 7 is an example of a screen displaying an aerial photograph.

Referring to FIG. 7, an aerial photo of Geneva, Switzerland is illustrated. The system allows for viewing and tracking over a scanned aerial photograph. This figure illustrates how the system can use an aerial photograph in the same manner as a digital or raster map. The X indicates the position of a vehicle.

Figure 8:
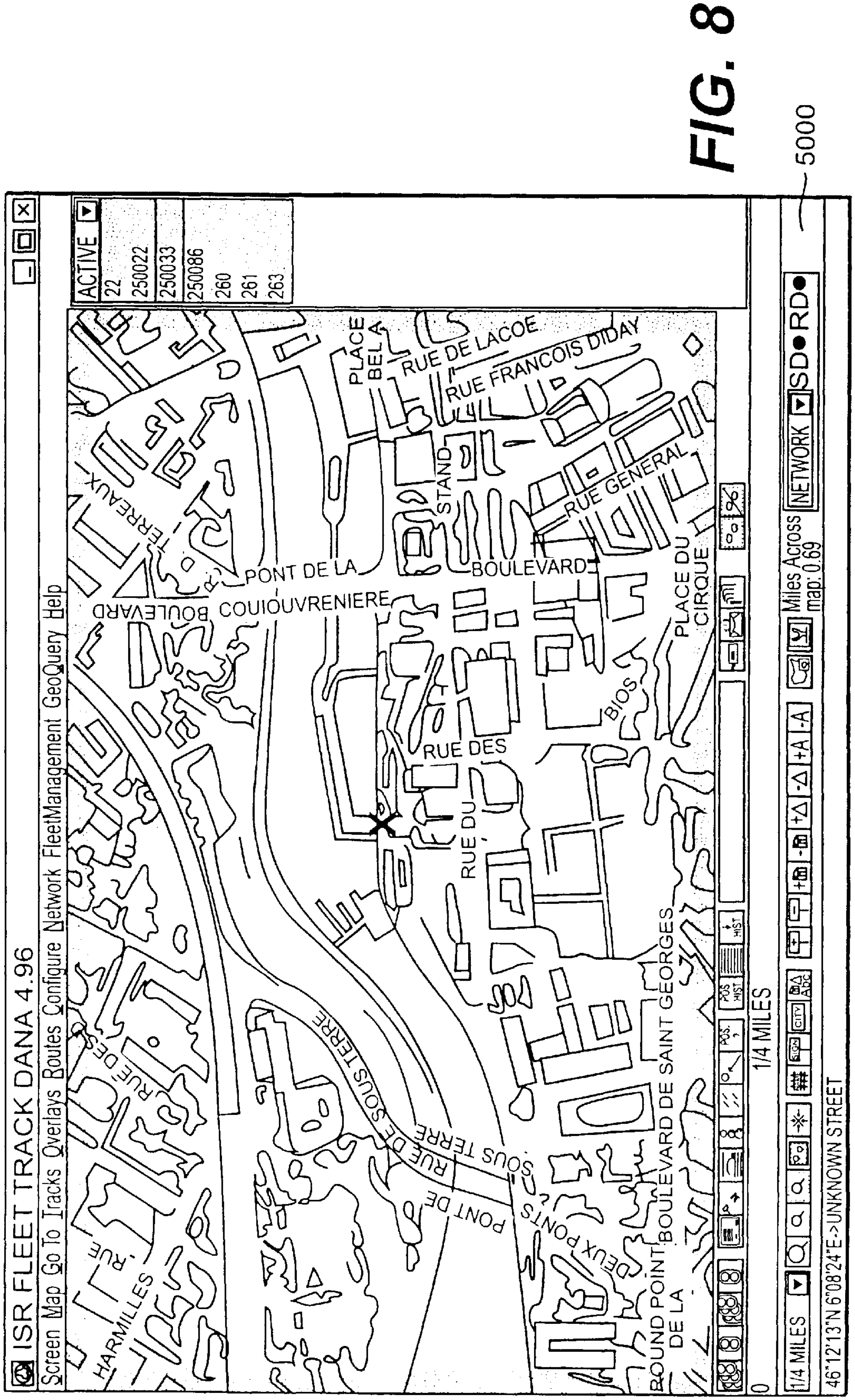
FIG. 8 is an example of a screen displaying an enhanced section of a map.

Referring to FIG. 8, a section of the map illustrated in FIG. 7 is enhanced to provide a better viewing of the map. The enhanced view provides a more detailed view of the map. The X indicates the position of a vehicle. In the enhanced view, the vehicle being tracked is crossing a bridge.

Figure 9:
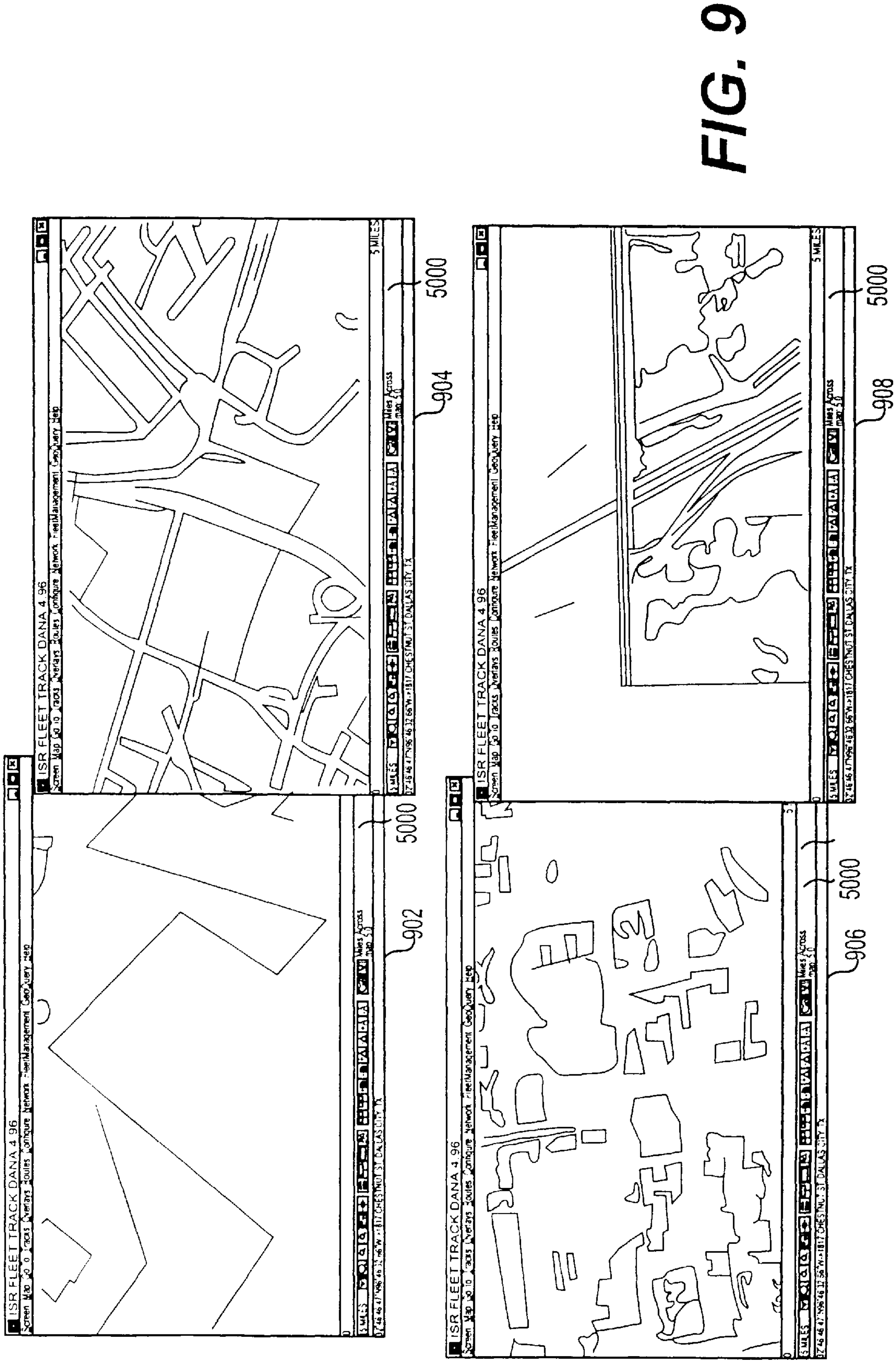
FIG. 9 is an example of a screen displaying a variety of maps.

Referring to FIG. 9, a variety of different maps are shown. Map 902 shows an overview of Switzerland with the layout of the streets. Map 904 shows a more detailed view of Switzerland with the name of the streets. Map 906 shows an aerial photograph. Map 908 shows a combination of a detailed map with an aerial photograph. The aerial photograph includes icons for a police station, a vehicle's location and an entrepot.

Figure 10:
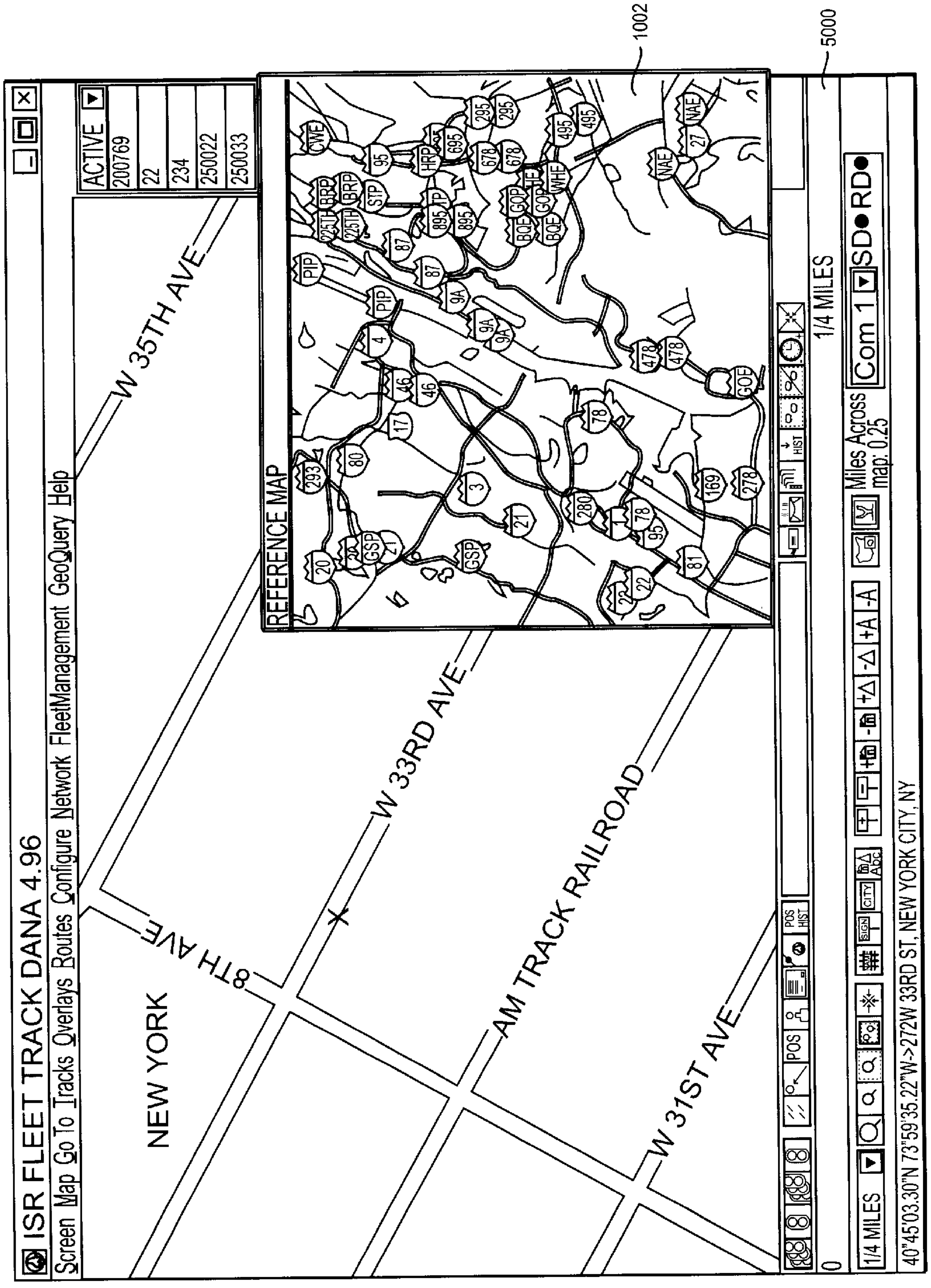
FIG. 10 is an example of a screen displaying a map containing a reference map.

Referring to FIG. 10, a map containing a reference map is illustrated. Reference map 1002 is four times the scale of the detailed map. In alternate embodiments, the size of the reference map can be varied, either smaller or larger scale, while the detailed map scale remains fixed. Also, By moving the position on the detail or the reference map, the corresponding position on the other map can be selected to change concurrently.

Figure 11:
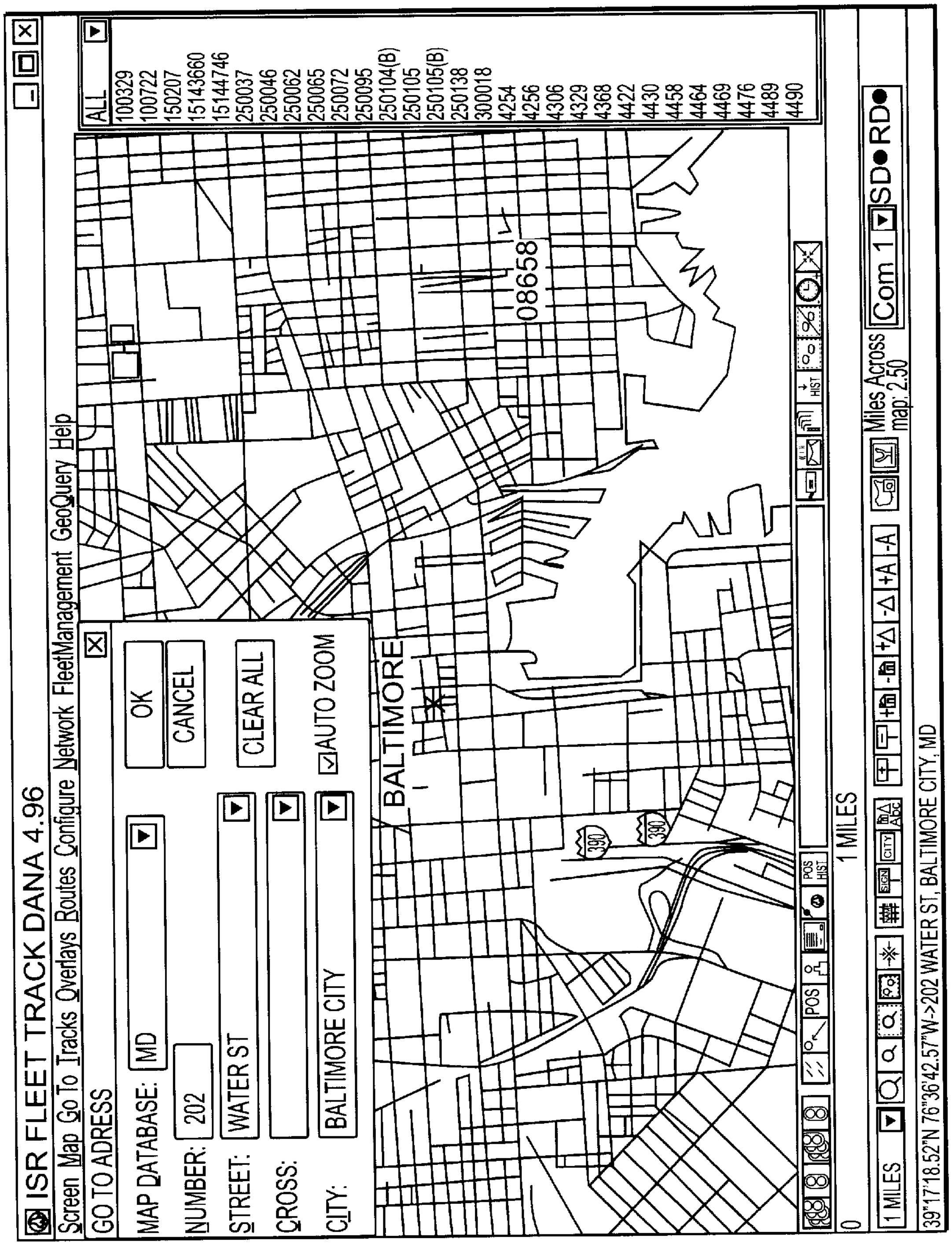
FIG. 11 is an example of a screen displaying the results of the search function.

Referring to FIG. 11, the results of a search function are shown. The user enters a location and a map is generated. The user is able to find a location based on a variety of searching means which include address, city and state, latitude, longitude and the like. In this example, the user entered the street address of 64 East Barre Street in Maryland. East Barre Street is located in Baltimore's Inner Harbor. The X indicates where on the map, 64 East Barre Street is located.

Figure 12:
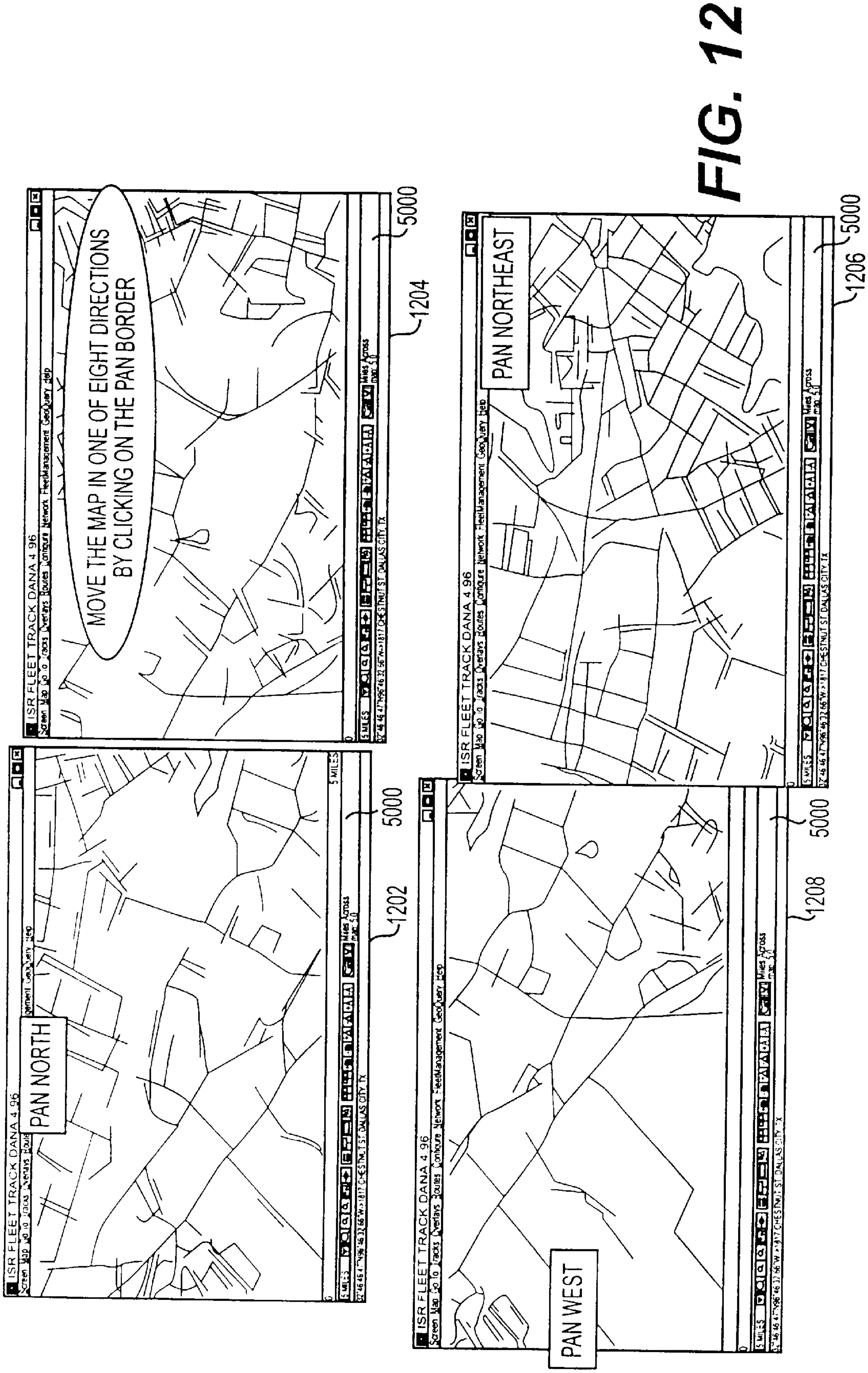
FIG. 12 is an example of a screen displaying the panning function.

Referring to FIG. 12, the panning function is illustrated. Panning allows the user to observe the different areas in relation to a vehicle or other markers. In the preferred embodiment, the system allows the user to scan in eight directions, North, South, East, West, Northeast, Northwest, Southeast, and Southwest. In alternate embodiments, the number of panning directions can vary. To pan, the user clicks on the Pan Border icon in the menu bar. In map 1202, the user is panning in the northern direction. In map 1204, the user in panning in the southern direction. In map 1206, the user is panning in the northeastern direction. In map 1208, the user is panning in the western direction. In addition to panning, the user can also zoom in and out.

Figure 13:
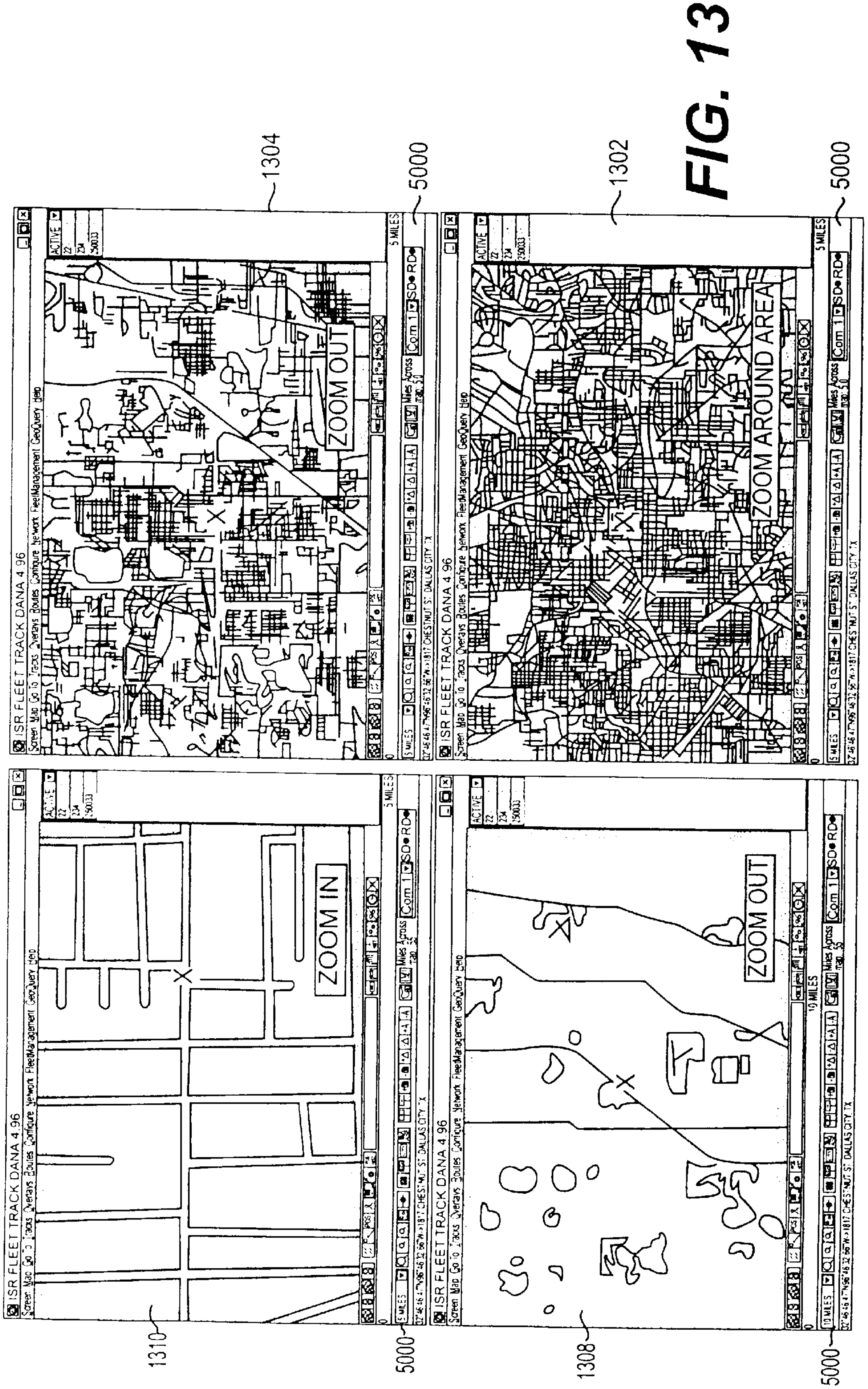
FIG. 13 is an example of a screen displaying the zooming function.

Referring to FIG. 13 the zooming function is illustrated. Zooming allows the user to change the magnification of the screen. In the preferred embodiment, the user is able to zoom in and out of the entire map, a specific area defined by the user, or around signs and objects. In map 1306, the user highlights the area (Annapolis, Md.) which the user would like to magnify. The distance across the map is two (2) kilometers. In map 1302, the highlighted area is illustrated. The distance across the screen is sixteen (16) kilometers. In map 1304, the highlighted area is zoomed out at three times the magnification. The distance across the screen is four (4) kilometers. In map 1308 highlighted area is zoomed out five times the magnification. The distance across the screen is sixteen (16) kilometers. In map 1310, the highlighted area is zoomed in to twice the magnification. The distance across the map is half(½) a kilometer. In the preferred embodiment, the magnification can range from about thirty (30) meters to 417 kilometers (250 miles). The zoom scale feature can be automatically pre-set by each user. If a user knows he generally uses zoom-out at 10 times magnification for example, he can customize this setting as a default.

Figure 14:
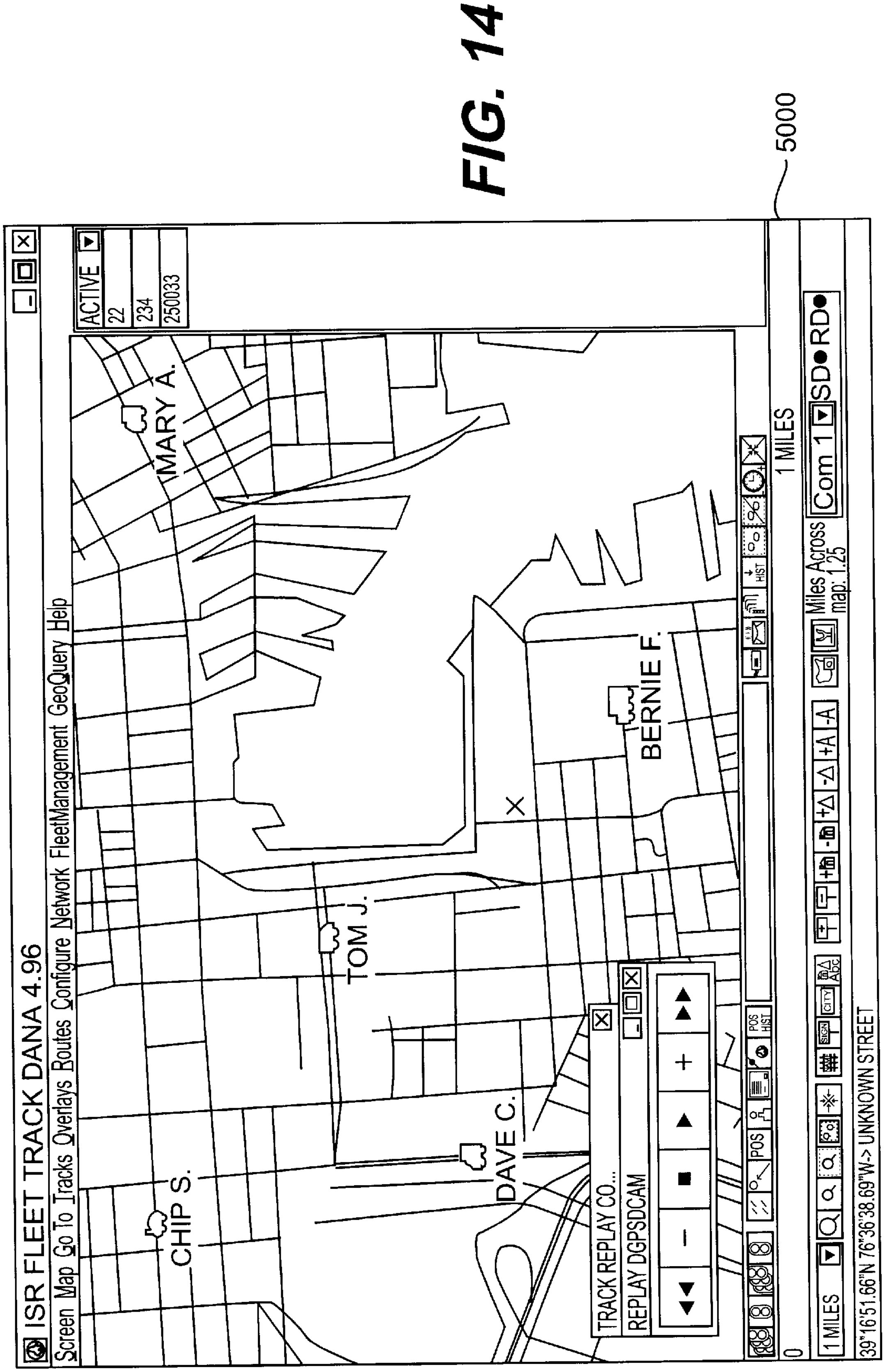
FIG. 14 is an example of a screen displaying real time tracking of a vehicle.

Referring to FIG. 14 real time tracking of a vehicle is illustrated. To track a vehicle in real time, the user selects the vehicle and tracks the vehicle. A plurality of vehicles can be tracked at the same time. As illustrated, a tracking menu bar is displayed. The replay can go back and forward at low or high speeds. The tracking can be played, paused, or stopped by clicking on an icon.

Figure 15:
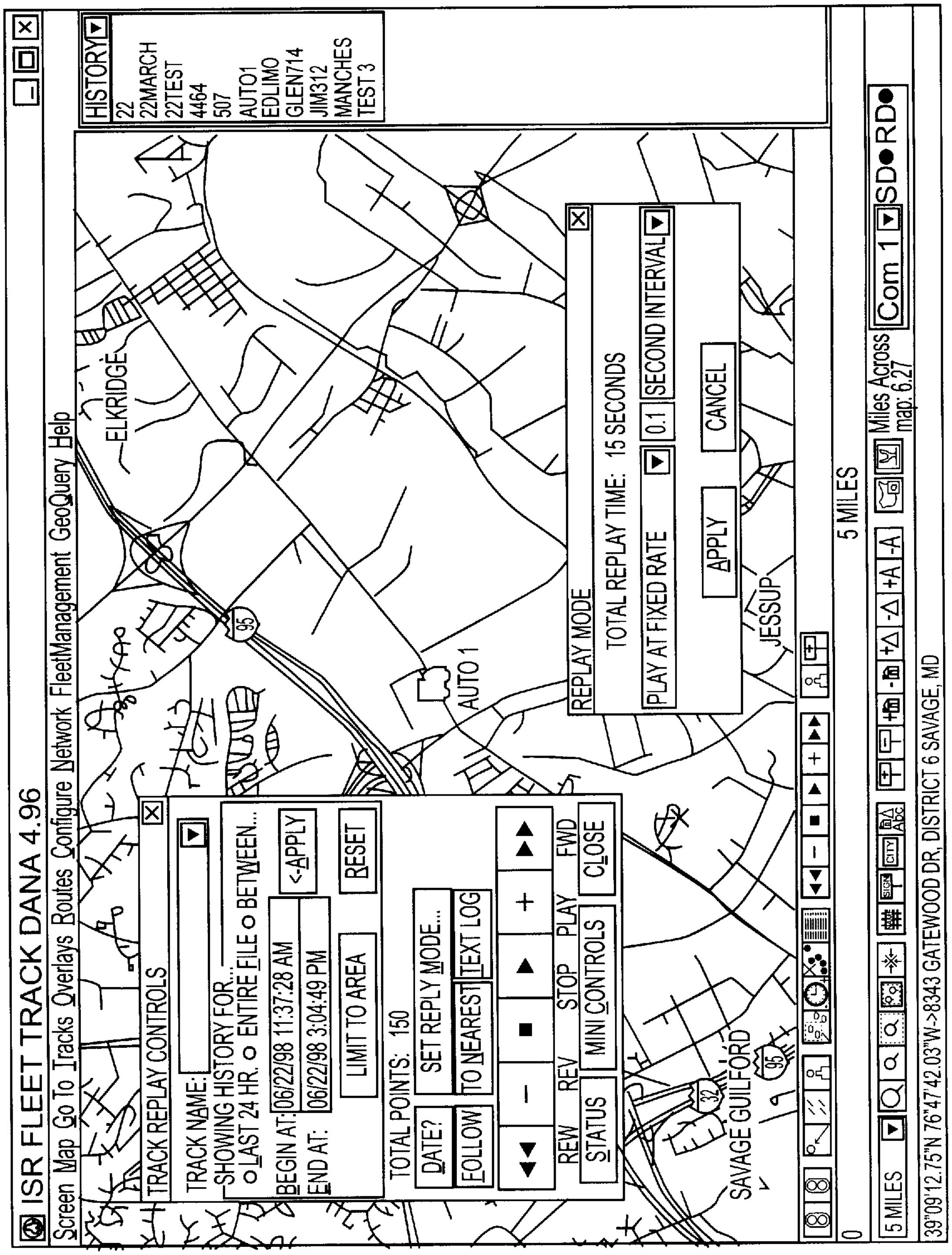
FIG. 15 is an example of a screen displaying the track replay controls.

Referring to FIG. 15, the track replay controls are illustrated. The track replay controls allow a user to view all or part of a vehicle's route. The play back can be selected by the date, time, or area. In addition, the rate of the play back can be adjusted as well. In the preferred embodiment, the replay speed can be automatic or manual set. The track replay controls are menu driven. As illustrated, the user enters the track name, in this example the tracking name is the driver's first name. The track replay options allow the user to determine the time period for the display should be. The display options include the last twenty-four hours, the entire file, or for a set time period ("between"). In this example, the user enters the time period of 19:50:48 to 22:27:38 on Apr. 21, 1998. The search can also be limited to an area. In this roughly 2 hour and forty minute time period, the system recorded 768 reference points.

The user can elect to change the date, set the replay mode (speed of the playback), follow the vehicle, "To Nearest," and enter text notes into the "Text Log." The user can fast rewind, rewind, stop, play, forward, or fast forward the tracked path. The "To Nearest" function provides a map of the area where a vehicle's position was last known. The "Text Log" function provides a text footnote which can include such information as a date and time stamp, address, geographical coordinates and other data relating to a vehicle or driver. The text footnote can also be imported into a word processor. The user can use the imported text footnote to generate a report.

Also shown in FIG. 15, is the replay mode which illustrates the playback mode parameters. As illustrated, the total replay time is 6 minutes. This total replay time is the amount of time the system requires to playback the tracking. The total replay time covers the total tracking time which was roughly the two hour forty minute track. This time is an example of the total replay time. The total replay time varies on the computer system and the requested time for playback. As illustrated, the user selected the rate of the playing to be at 0.5 second intervals. The different options for the playback speed are either fixed or proportional. The different options for the time intervals are user defined.

Figure 16:
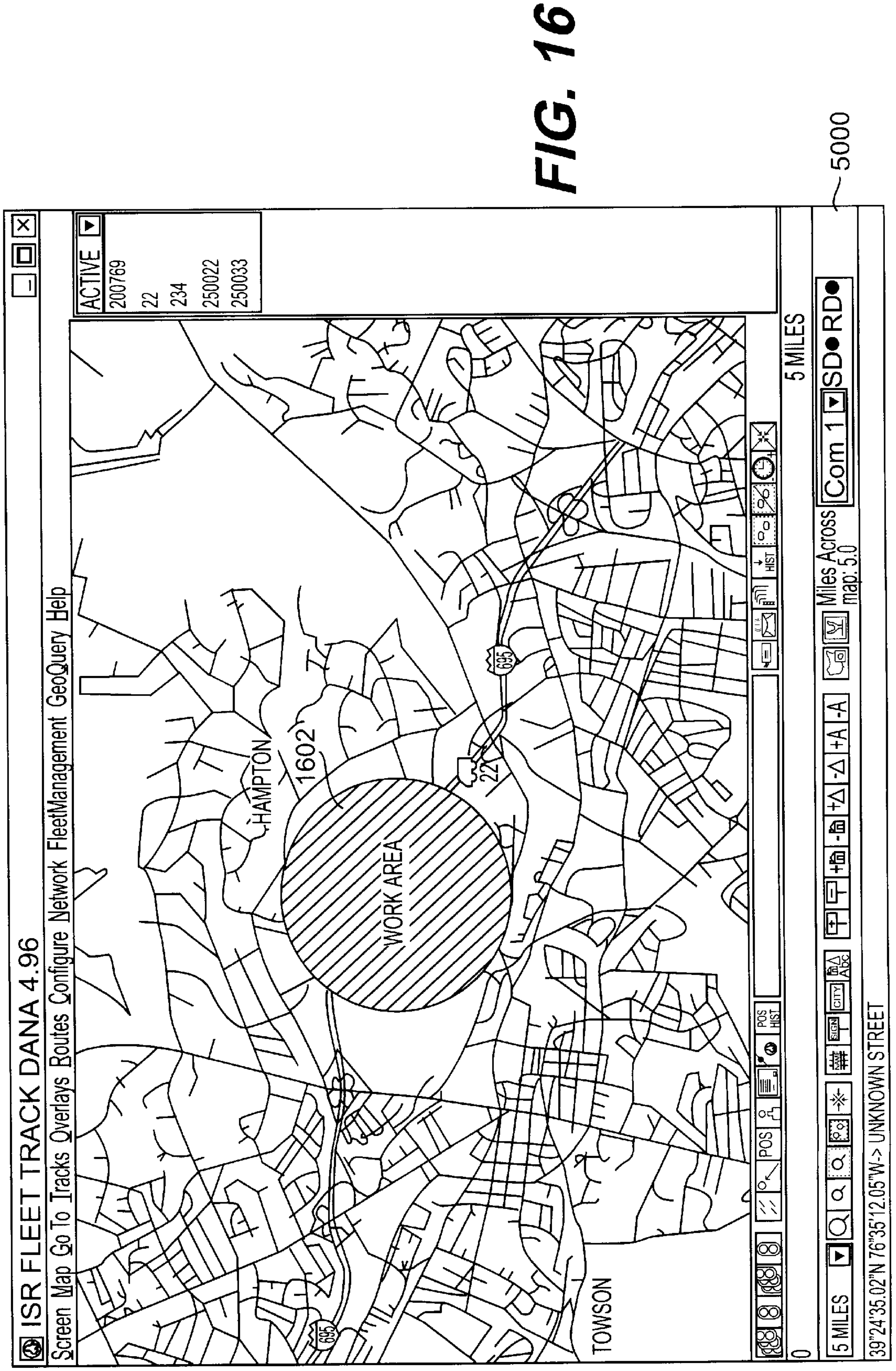
FIG. 16 is an example of a screen displaying the alert zones for event tracking.

Referring to FIG. 16, the alert zones for event tracking are illustrated. Highlighted area 1602 is an alert zone. An alert zone is a designated area on a map. In the preferred embodiment, when a vehicle enters and/or exits a designated area, an alarm is triggered informing the user. The alert zones can include "prohibited" and "permitted" zones. If a zone is a "prohibited" zone, an alarm is triggered if the vehicle enters the prohibited zone. This situation can occur with rental cars leaving the United States and entering Canada or New Mexico. If a zone is a "permitted" zone, an alarm is triggered if the vehicle leaves the permitted zone. This situation can occur with delivery vehicles leaving their designated delivery area. In another embodiment, an alarm can be triggered if the vehicle is within a set distance of prohibited zone or permitted zone. Event tracking ca be accessed by either the event tracking databases or directly form the G.P.S. receiver on a vehicle.

Event tracking typically requires less processing and transmissions because vehicles are less likely to enter or exit a designated area. Since transmissions occur only when an event is triggered, the base station does not have to process as many transmissions. Since there are less transmissions, the air time bill for the transmissions is lower as well. Therefore, the event feature can be used to lower back-end operating costs and save on monthly air time bills.

Figure 17:
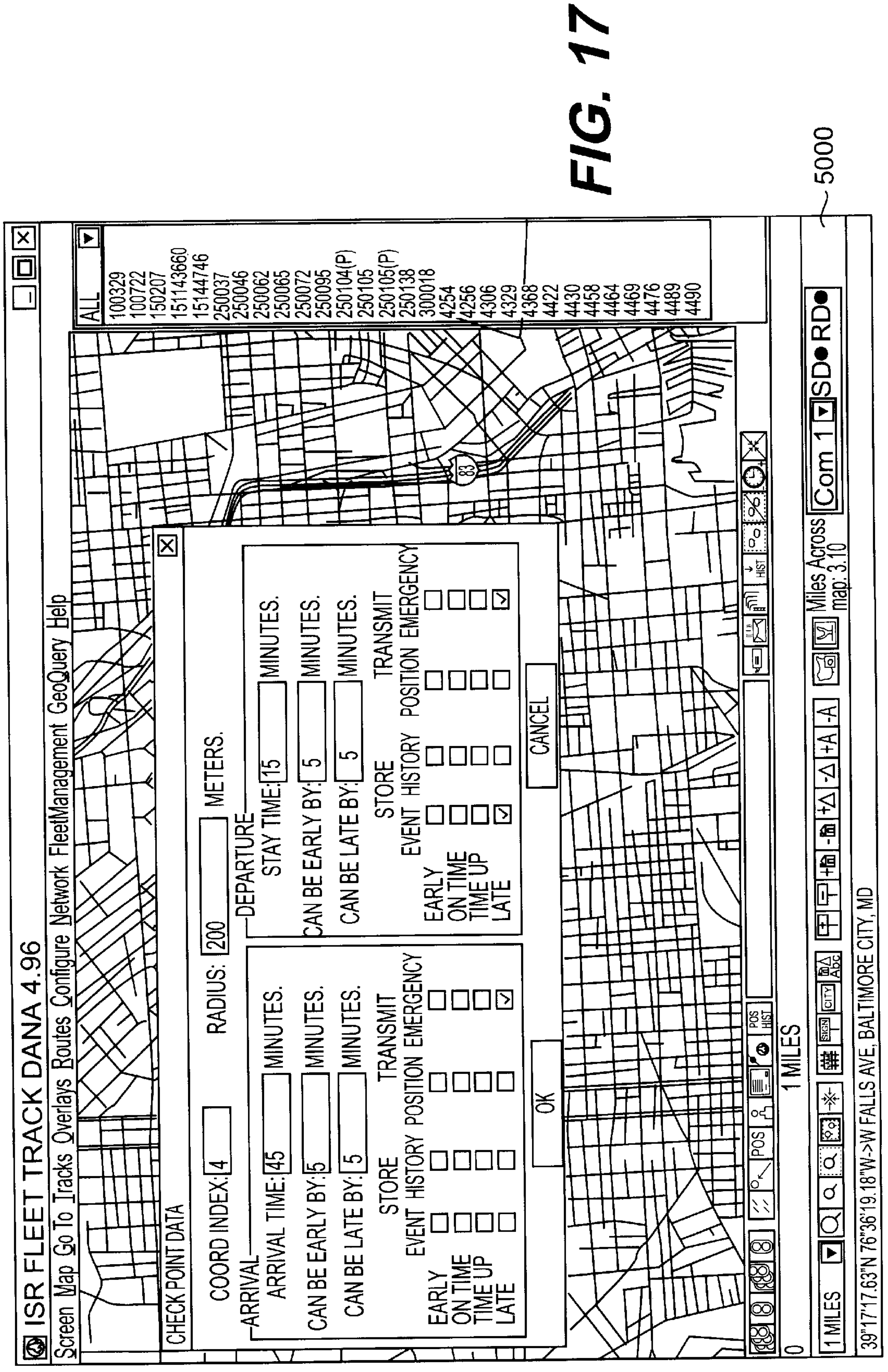
FIG. 17 is an example of a screen displaying the routing function.

Referring to FIG. 17, the routing function is illustrated. The routing function is a scheduling function where the user can set up a schedule for a vehicle. Using the routing function, the user can determine where a vehicle should be located at a specific time. If a vehicle is not at a specific location within a given time limit, an alarm can be setoff to inform the user that a vehicle is behind schedule. An alarm can also be setoff if a vehicle stays at a location for an extended period of time.

Figure 18:
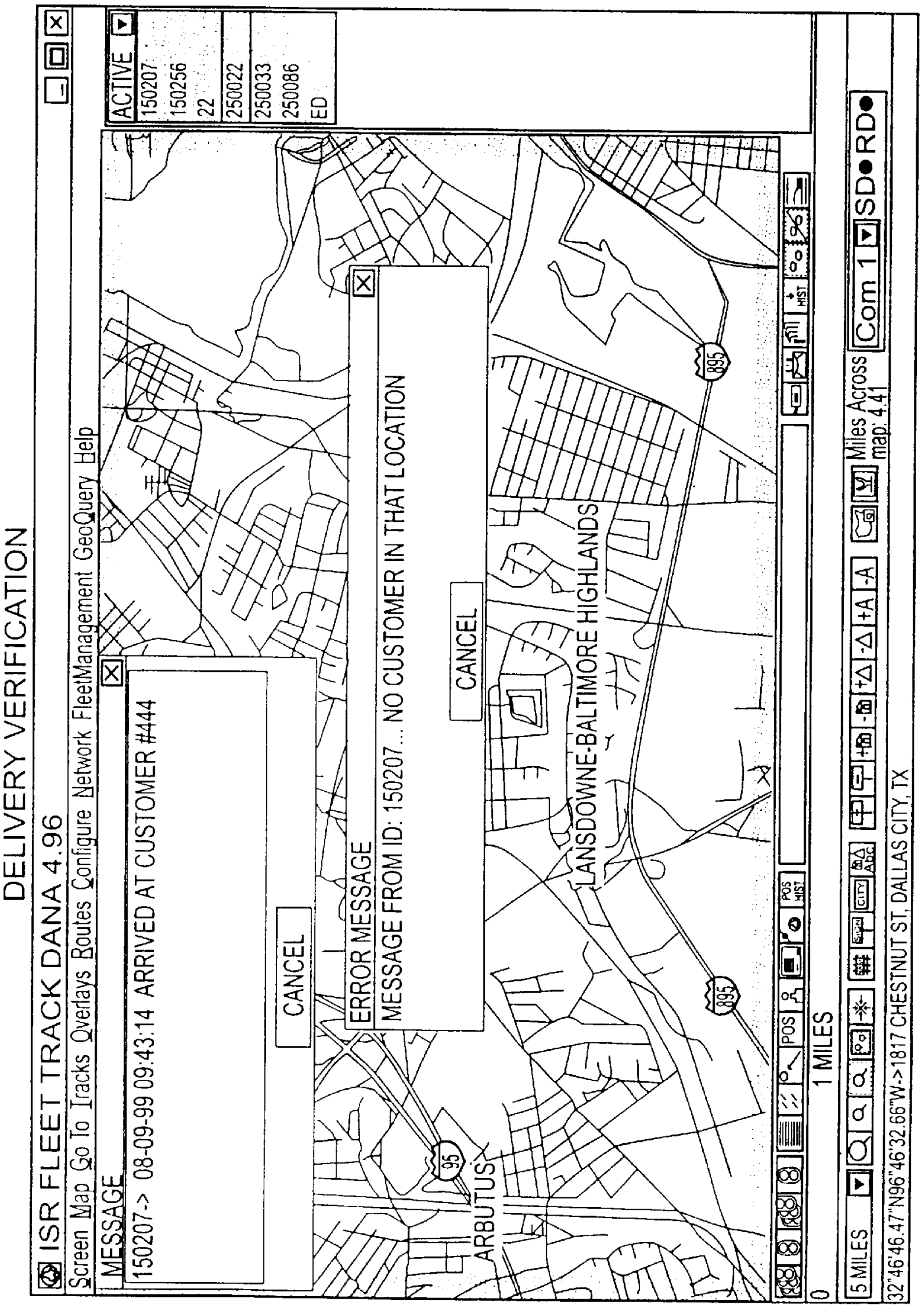
FIG. 18 is an example of a screen displaying the delivery verification function.

Referring to FIG. 18, the delivery locator function is illustrated. The delivery locator allows the user to independently ensure that a vehicle is in the proper place for a delivery. A driver sends verification 1802 to the base station when he has arrived at a delivery location. The user located at the base station identifies the vehicle and driver information to be checked. The driver's current location as reported by the G.P.S. receiver and the driver location is cross-checked with the routing function database. This database identifies the end location of where the driver should be. If there is an error, the user sends a message 1804 that will be displayed on the driver's on board computer system. The delivery locator is particularly useful where delivery is just a drop-off, such as loading a gas station's reserve tank in the middle of the night. This example is not meant as a limitation, as those skilled in the art will appreciate that the delivery locator may also provide such notification in an automated or semi-automated way.

Figure 19:
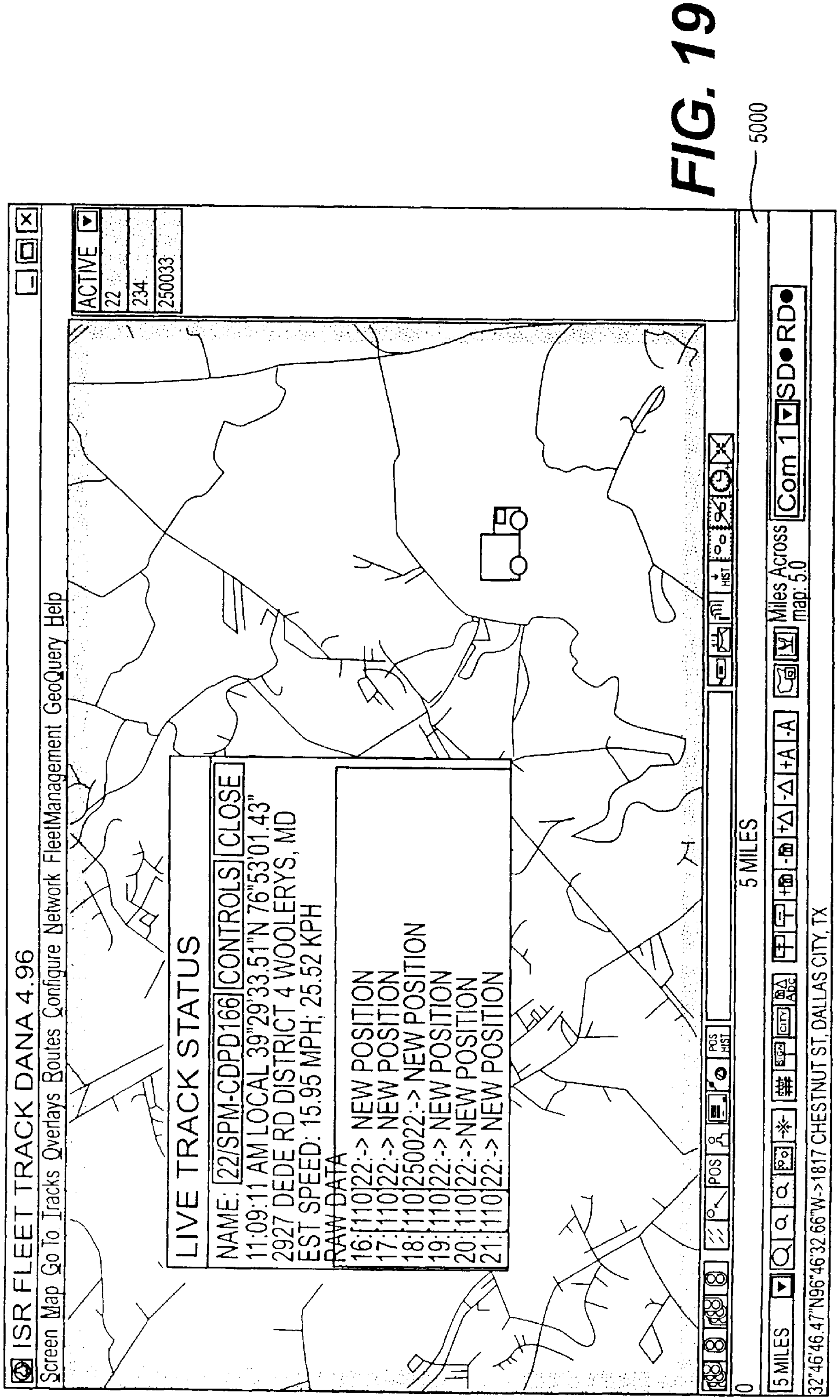
FIG. 19 is an example of a screen displaying the interface function.

Referring to FIG. 19, a screen displaying the interface function is illustrated. This function allows the user to select from all the routing functions, and choose any number of functions for split-screen display. The user "right-clicks" on, or otherwise selects, the vehicle for a drop-down menu of the routing functions. This feature gives the dispatcher precise real-time information on any vehicle.

The system also comprises a password protection feature. This feature prevents dispatchers from performing a function they are not authorized to perform. When a dispatcher comes on shift, he logs into the system by typing in a password. Each password is associated with certain permissions indicative of those functions a specific dispatcher may perform. This feature enables staged training of dispatchers since a dispatcher can only perform those functions for which he or she is specifically authorized. This system also prevents unauthorized access to the system by other employees or even on-line saboteurs.

A "request distance" feature is also a part of the present invention. Each vehicle has instrumentation monitoring health and status parameters. One parameter is distance traveled by each vehicle during its life. The dispatcher can select vehicles in any grouping, such as a particular make and model, and select a time in days, weeks, months, or years needed to be tabulated. A report format, for example Microsoft Excel™, can be selected for reporting of results. Once the dispatcher selects vehicles and desired periods, a report is generated. The report request can also be configured to automatically access a vehicle maintenance database, generating vehicle specific maintenance comparisons for make and model and the number and severity of repairs per units of miles driven, for example 5 repairs for every 10,000 miles driven.

Figure 20:
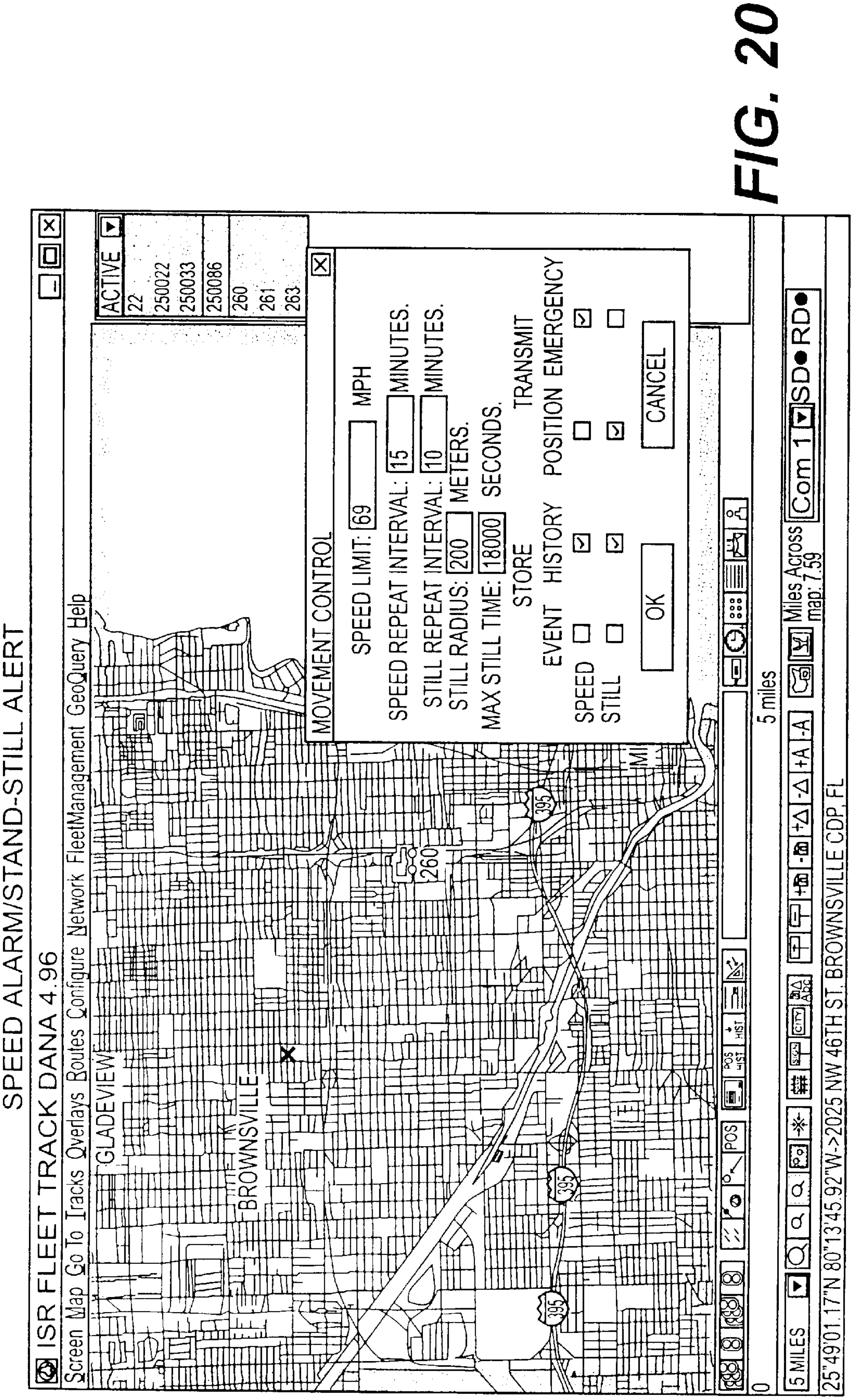
FIG. 20 is an example of a screen displaying the speed alarm feature.

Referring to FIG. 20, the speed alarm function is illustrated. This feature automatically sounds an audio alert and displays a message 2002 when a vehicle is either speeding or standing still at a place where it should not be, or for an amount of time longer than predicted. This alert can be customized to sound in the base station, the vehicle, or both. Speeds for each route are integrated with routes each drivers are taking at the time of monitoring. As a result, route efficiency and driver safety reports can be calculated.

Additionally, the user may be alerted to initiate an ignition kill switch, as discussed below in the remote control feature.

The present invention also comprises a function to find the closest vehicle. If an event occurs, such as a delivery or pick-up, or a request for a taxi or an ambulance to name but a few examples, the address of the event is displayed on the map. When the dispatcher selects the find closest vehicle function, whatever vehicles in the fleet are closest to the event are highlighted on the screen with a flashing indicator or icon. The user selects the "send mission" option which automatically sends the street address of the event to the closest vehicle. The tracking of the selected vehicle is automatically integrated, and the user receives notice that the closest vehicle has arrived on the scene.

The present invention also comprises a transmission error feature, which can occur in a fully or semi-automated way, and which alerts the dispatcher to communications problems. The transmission error feature displays all messages that experience transmission problems in reverse text. In other words if a message is normally in black print with white background, it will be displayed in white print with a black background when a dropout occurs. In this way, the sender is prompted to check the message and re-transmit a corrected version if necessary.

The present invention also comprises an on-line help feature. The on-line help feature provides the user with access to an information database on how to use ISR FleetTrack. The user can select Help from a pull down menu. Help is displayed in a smaller screen on the display. The user can search for topics or select a topic by viewing a table of contents.

Figure 21:
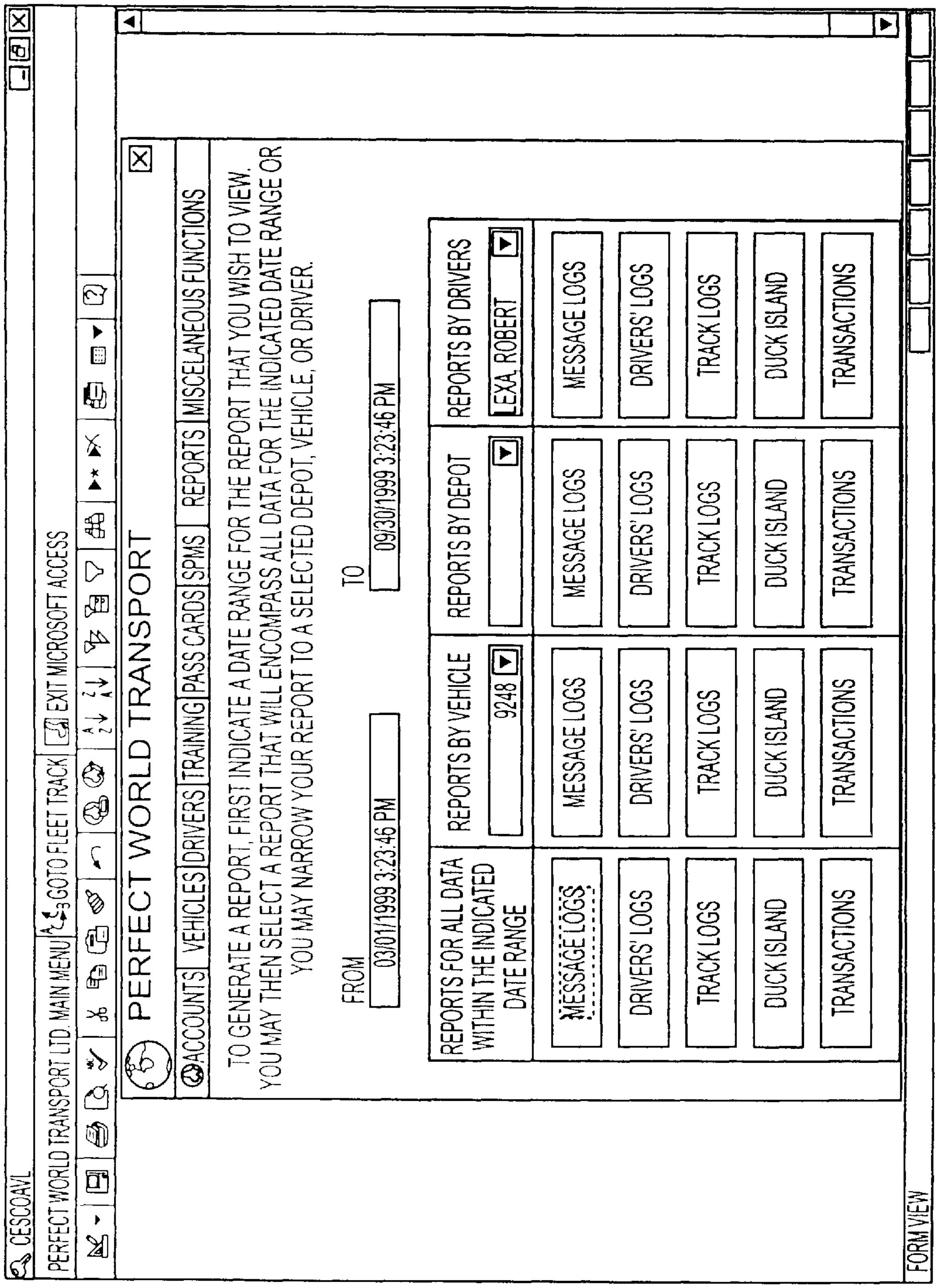
FIG. 21 is an example of a screen displaying the user selection to create integrated reports.
Figure 22:
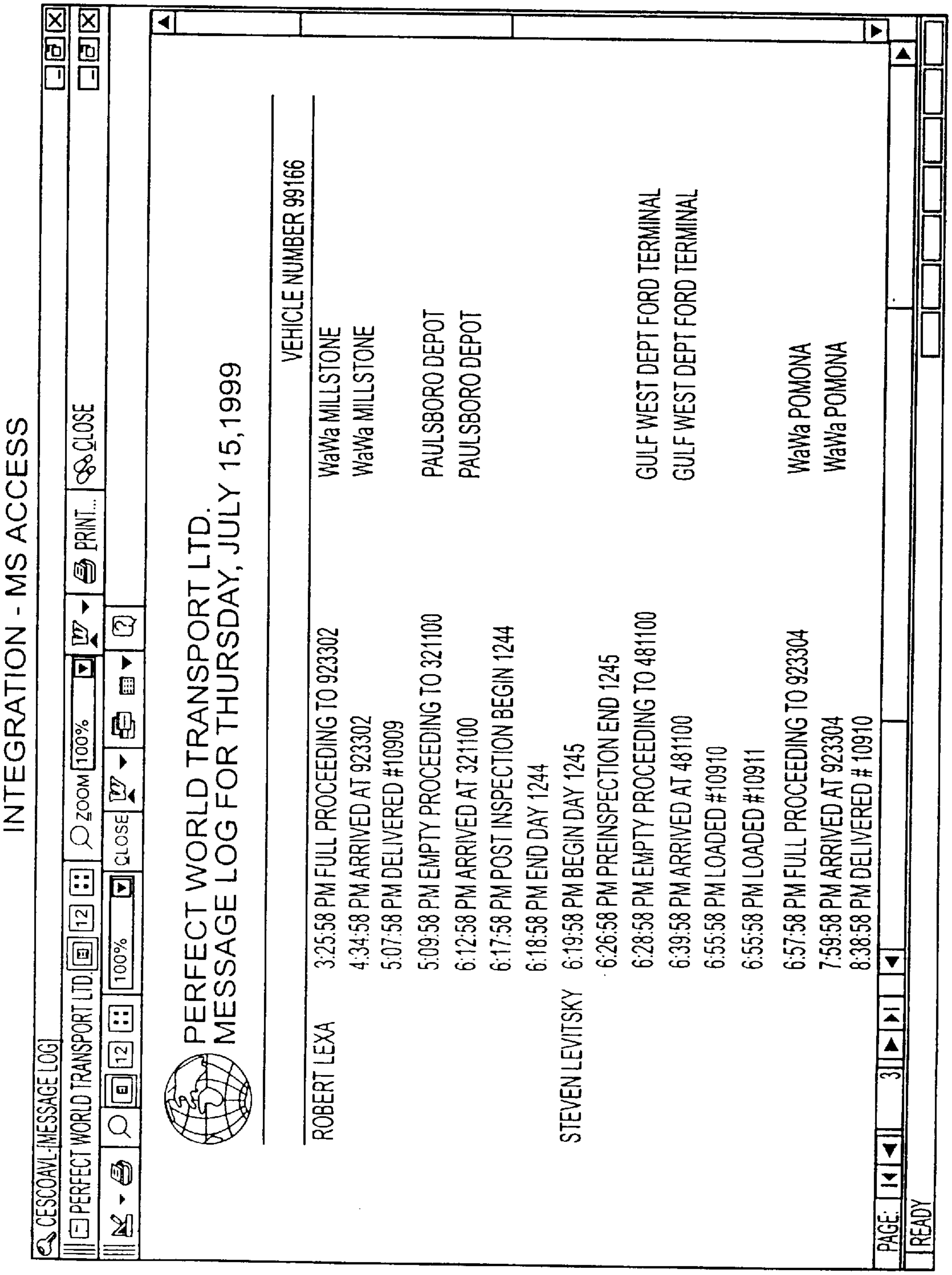
FIG. 22 is an example of a screen displaying the integrated report feature for a specific operating system.

Referring to FIGS. 21, 22, and 23, the report integration feature is illustrated. The Report Integration feature allows information from any database to be included in other software applications for report generation. Information can be in either graphic or text form. Log reports, spread sheets, or any other document type can be created by selecting information fields from any of the system databases. This feature fully integrates each database to Microsoft™ applications, such as Access™, Excel™, and Word™, as well as Foxpro™. Referring to FIG. 21, the user can select from any of the parameters, such as track logs and/or driver logs, to include in the desired report. Referring to FIG. 22, as an example, without limitation, of all messages transmitted from a selected vehicle on a selected date are illustrated. This particular report is configured to prepare the report with the Microsoft Access™ operating system. Referring to FIG. 23, a spreadsheet is prepared with Microsoft Excel™ that reports a record of speed for all vehicles. This type of report is useful for policing driver performance as well as for insurance purposes. It will be obvious to those skilled in the art that other applications may be integrated in this fashion as well.

Figure 24:
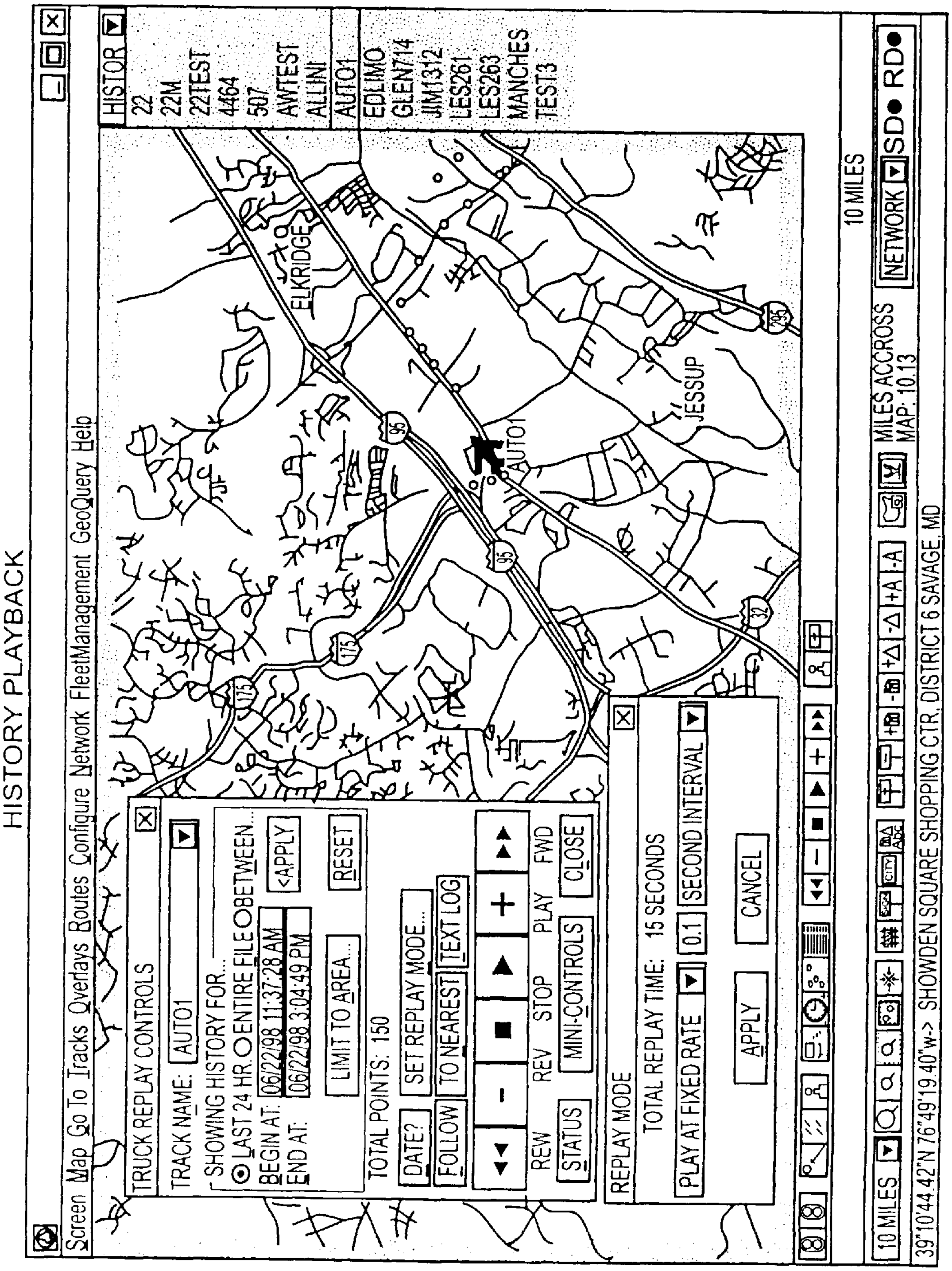
FIG. 24 is an example of a screen displaying the check route feature.

Referring to FIG. 24, the "check route" feature is illustrated. This feature automatically cross-references real time tracking 2402 with track replay controls 2404. The user can select one or more drivers. The user then sets a deviation for check points for the route of each driver selected. The vehicle instrumentation system is given commands to transmit when the vehicle reaches a check point. Thus, the feature is self-checking. When the driver reaches each check point along the route, the user is alerted. The track replay controls 2404 allow the user to simultaneously display either some or all of the vehicles driving route.

Figure 25:
FIG. 25, is an example of a screen displaying the remote control feature.

Referring to FIG. 25, the remote control feature is illustrated. The remote control feature allows a user to control certain functions on a vehicle from the base station. Vehicles are instrumented with telemetry sensors connected to the computer system 106, previously described herein. These sensors detect parameters such as fluid levels, temperature of the vehicle, as well as any temperature-sensitive storage present on the vehicle, etc. The sensor information is transmitted through the transceiver to the base station. Other switches connected to the computer are set on the vehicle to provide remotely activated control functions. Thus, a user at the base station designates a vehicle 2502 to be mentioned, and thereby activates functions on the vehicle, including but not limited to locking and unlocking doors, raising and lowering windows, activating or deactivating the security alarm, and cutting off the ignition. The user can also switch telemetry sensors on and off. This is useful if a sensor malfunctions.

Figure 26:
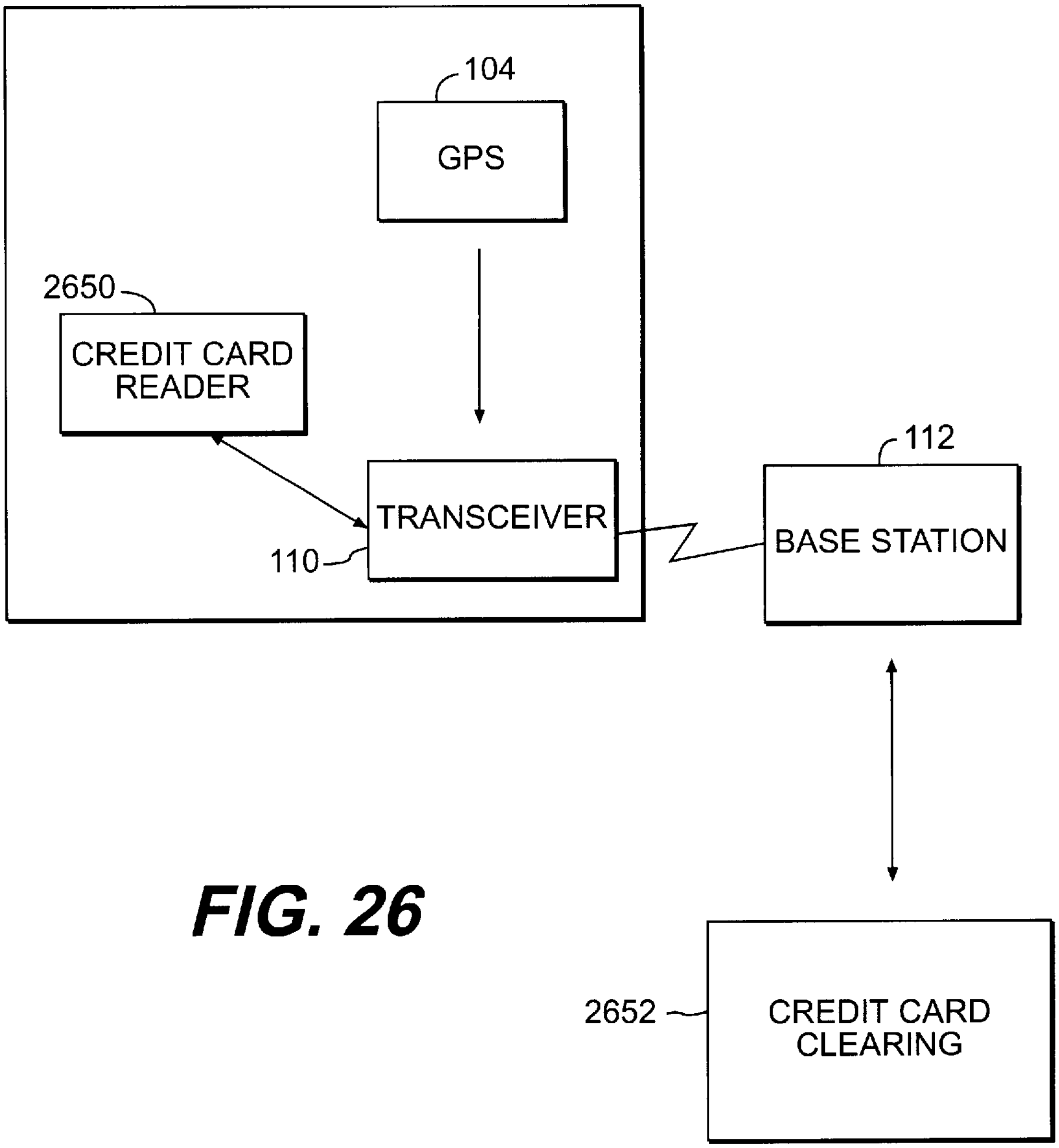
FIG. 26 is an example of a screen displaying the peripheral integration.

Referring to FIG. 26, the peripheral integration feature is illustrated. Peripheral systems, such as credit card scanners 2650, can be used from within the vehicles. The terminal is connected to the transceiver 110 and processed through the base station 112, which sends information and receives authorizations from a credit card facility 2652. Thus, a driver can accept a credit card payment for service, such as a taxi ride, or for payment upon delivery of goods. This feature also allows the user to track customer information for integrated reports as well.

As noted above, the present invention has a number of report access features. Vehicle information can be automatically downloaded into report files. A user can access all functionality reports generated for a specific vehicle by using the mouse to select the vehicle's icon. When the vehicle is selected, a menu is displayed that allows user to choose parameters, including but not limited to gas mileage and distance driven. After the user chooses a function, the report for that vehicle is then displayed in a window on the display. The user can independently scroll down the report and review the contents without affecting other windows on the display.

The base station user has options for messaging and control. For example, a switch text feature automatically switches between sending text messages and control functions between the base station and vehicles. Health and status sensors provide indications, such as "low fuel" or "door open" which are transmitted from each vehicle to the base station. The switch text feature allows the vehicle to accept either a command or a text message to be displayed. For example, for the "door open" indication, the user could send a command that throws the lock switch or send a text message telling the driver to close it. For a "low fuel" indication, the user can send the driver information on the closest gas station. The transmission would be sent by the user seamlessly by simply highlighting the information and clicking on the send message feature.

Referring to FIGS. 2–20 and FIGS. 24–25, a customized toolbar is illustrated 5000. The customized tool bar feature allows the user to add "hot-buttons" for features he would like to have at his fingertips. All tracking features, access controls to vehicles, and three levels of vehicle history can be chosen from to add to the tool bar.

Another feature of the tracking software is the "code key" feature. The software automatically code keys messages so that information transmitted in messages sent from a vehicle to the base station can be downloaded into the correct report databases simply by virtue of the presence of a code key. Events such as whether the driver is stopped for off-loading cargo, vehicle malfunction, or traffic might not be easily discerned from the telemetry automatically tracked on the vehicle. When a message comes from the vehicle to the user, the tracking software automatically scans the message for code key words. If a coded word is in the message, such as off-load, the message information will be downloaded into the associated database as designated by the code.

The tracking capability of the present invention additionally has an automatic switch mode feature for seamlessly integrating wireless communication signals, i.e.—between digital and analog signals. In this embodiment, Cellular Digital Package Data (CDPD) is the digital signal used. However, it is obvious to one skilled in the art that various signal frequencies can be used. This feature ensures that communications between vehicle transceivers and the base station do not experience drop outs.

Although the particular embodiments shown and described above will prove to be useful in many applications relating to the arts to which the present invention pertains, further modifications of the present invention herein disclosed will occur to persons skilled in the art. All such modifications are deemed to be within the scope of the present invention as defined by the appended claims.

I claim:

1. A system for tracking and graphically displaying the positions of vehicles in a fleet comprising:

at least one vehicle comprising:

a G.P.S. receiver for receiving G.P.S. data; and a communicator coupled to the G.P.S. receiver for communicating the G.P.S. data to a base station;

the base station comprising:

a base station receiver for receiving the G.P.S. data from the communicator;

a computer system coupled to the base station receiver, wherein the computer system comprises:

a database comprising text data relating to the at least one vehicle and a graphical representation of the at least one vehicle;

mapping and tracking software for tracking and displaying the position of the at least one vehicle on a map;

updating software for interacting with the mapping and tracking software wherein the updating software further comprises instructions for updating the text data in the database when the base station receiver receives G.P.S. data, updating the graphical representation of the at least one vehicle when the base station receiver receives G.P.S. data, linking the text data and the graphical representation of the at least one vehicle, and interactive communication by a user at the base station with the at least one vehicle;

a display for receiving instruction from the mapping and tracking software and for displaying the text data and graphical representation of the at least one vehicle;

a selector interacting with the mapping and tracking software, wherein the updating software further comprises instructions for displaying text data from the database when the graphical representation of the at least one vehicle is selected using the selector and further comprises instructions for displaying the graphical representation of the at least one vehicle when the text data is selected using the selector; and wherein the updating software further contains instructions for identifying preselected words for detection when transmitted in a message of communicated data and for downloading the communicated data associated with the preselected words into separate report databases.

2. The system of claim 1 wherein the updating software contains instructions to compare a vehicle's actual location with a vehicle's actual destination.

3. The system of claim 1, wherein the database further comprises a vehicle information file and a driver information file.

4. The system of claim 3, wherein the vehicle information file further comprises vehicle identification, make of the vehicle, model of the vehicle, year vehicle was manufactured, the state where the vehicle is registered, type of vehicle, color of vehicle, telephone number at which the vehicle can be reached, a time stamp indicating when the vehicle was assigned to a driver, and a link to the driver information file for providing driver information for the driver of the selected vehicle.

5. The system of claim 3, wherein the driver information file further comprises driver identification, driver name, sex of the driver, date of birth for the driver, position of the driver within the company, driver license number, address of the driver, telephone number at which the driver can be reached, and a link to the vehicle information file for providing the vehicle information of the vehicle being driven by the driver.

6. The system of claim 1, wherein the database further comprises a schedule file.

7. The system of claim 6, wherein the schedule file further comprises the status and itinerary of the at least one vehicle in the fleet.

8. The system of claim 1, wherein the database further comprises a map file having at least one map.

9. The system of claim 8, wherein the at least one map is selected from the group consisting of: raster scanned maps, aerial photographs, and digital maps.

10. The system of claim 1, wherein the communicator is a transceiver for transmitting and receiving messages.

11. The system of claim 10, wherein the transceiver communicates using a communication means which is selected from the group consisting of: radio, cellular, digital radio, satellite, and the Internet.

12. The system of claim 2, wherein the updating software comprises instructions for determining and recording a vehicle's speed and route based upon the received G.P.S. data.

13. The system of claim 12, wherein the updating software further comprises instructions for outputting insurance information relating to the vehicle speed, routes, vehicle information, and driver information.

14. The system of claim 8, wherein the updating software further comprises instructions to designate an alert zone, wherein the alert zone is an area designated on at least one map.

15. The system of claim 14, wherein the alert zone is a prohibited zone designated on at least one map.

16. The system of claim 15, wherein an alarm is triggered when a vehicle enters the prohibited zone.

17. The system of claim 14, wherein the alert zone is a permitted zone designated on at least one map.

18. The system of claim 17, wherein an alarm is triggered when a vehicle exits the permitted zone.

19. The system of claim 3, wherein the updating software contains instructions for generating a vehicle maintenance report from the vehicle information file.

20. The system of claim 13, wherein the updating software further comprises instructions for generating an alarm when a vehicle speeds or comes to a stop.

21. The system of claim 1, wherein the updating software further comprises instructions for locating a vehicle closest to an event indicated on the map.

22. The system of claim 1, wherein the updating software further comprises instructions for detecting a transmission error in a sent message and display said message in reverse highlighted text.

23. The system of claim 1, wherein the updating software further comprises instructions for comparing a planned vehicle route and a route actually followed.

24. The system of claim 1, wherein the updating software further comprises instructions for allowing a user at the base station to remotely control at least one function on the vehicle.

25. The system of claim 1, wherein the system comprises peripheral hardware connected to the communicator for interaction with the base station.

26. A system for tracking and graphically displaying the positions of vehicles in a fleet comprising:

at least one vehicle comprising:

a G.P.S. receiver for receiving G.P.S. data;

a vehicle transceiver for transmitting the G.P.S. data and for receiving transmissions from a base station; and a vehicle computer system coupled to the G.P.S. receiver and the vehicle transceiver, wherein the computer system comprises:

vehicle mapping and tracking software for tracking and displaying the position of the at least one vehicle on a map; and vehicle updating software for interacting with the vehicle mapping and tracking software and providing text data relating to the vehicle, graphically representing the at least one vehicle, and linking the text data and the graphical representation of the at least one vehicle; and a vehicle display interacting with the vehicle mapping and tracking software for displaying the text data and graphical representations of the at least one vehicle; and the base station comprising:

a base station transceiver for receiving the G.P.S. data from the at least one vehicle and for transmitting the text data and the graphical representation of the at least one vehicle;

a base station computer system coupled to the transceiver, wherein the base station computer system comprises:

a database comprising text data relating to the at least one vehicle and graphical representation of the at least one vehicle;

base station mapping and tracking software for tracking and displaying the position of the at least one vehicle on a map;

base station updating software for interacting with the base station mapping and tracking software wherein the base station text software comprises instructions for updating the text data in the database when the transceiver receives the G.P.S. data, updating the graphical representation of the at least one vehicle when the transceiver receives the G.P.S. data, linking the text data and the graphical representation of the at least one vehicle, and interactively communicating with the at least one vehicle;

a base station interacting with the base station mapping and tracking software and for displaying the text data and graphically representing the at least one vehicle; and a selector interacting with the base station mapping and tracking software for selecting a vehicle in the fleet;

wherein the base station transceiver transmits the text data and graphical representation of the at least one vehicle to the vehicle transceiver, wherein the vehicle software and the base station updating software each display text data from the database when the graphical representation of the at least one vehicle is selected using the selector and the updating software displays a graphical representation of the at least one vehicle when text data is selected using the selector; and wherein the updating software further contains instructions for identifying preselected words for detection when transmitted in a message of communicated data and for downloading the communicated data associated with the preselected words into separate report databases.

27. The system of claim 26, wherein the database further comprises a vehicle information file and a driver information file.

28. The system of claim 27, wherein the vehicle information file further comprises vehicle identification, make of the vehicle, model of the vehicle, year vehicle was manufactured, the state where the vehicle is registered, type of vehicle, color of vehicle, telephone number at which the vehicle could be reached, a time stamp indicating when the vehicle was assigned to a driver, and a link to the driver information file for providing driver information for the driver of the selected vehicle.

29. The system of claim 28, wherein the updating software further comprises instructions for generating an alarm when a vehicle speeds or comes to a stop.

30. The system of claim 27, wherein the driver information file further comprises driver identification, driver name, sex of the driver, date of birth for the driver, position of the driver within the company, driver license number, address of the driver, telephone number at which the driver could be reached, and a link to the vehicle information file for providing the vehicle information of the vehicle being driven by the driver.

31. The system of claim 27 wherein the updating software contains instructions to compare a specific vehicle's actual location with a specific vehicle's actual destination.

32. The system of claim 27, wherein the updating software contains instructions for preparing a vehicle maintenance report from the text data in the vehicle information file.

33. The system of claim 26, wherein the database further comprises a schedule file.

34. The system of claim 33 wherein the schedule file further comprises the status and itinerary of the at least one vehicle in the fleet.

35. The system of claim 26, wherein the database further comprises a map file having at least one map.

36. The system of claim 35, wherein the at least one map is selected from the group consisting of: raster scanned maps, aerial photographs, and digital maps.

37. The system of claim 26, wherein the base station transceiver and the vehicle transceiver each is selected from the group consisting of: radio, cellular, digital radio, satellite, and the Internet.

38. The system of claim 26, wherein the updating software further comprises instructions for locating a vehicle closest to an event indicated on the map.

39. The system of claim 26, wherein the updating software further comprises instructions for detecting a transmission error in a sent message and display said message in reverse highlighted text.

40. The system of claim 26, wherein the updating software further comprises instructions for displaying text and graphical data in a report generated in a previously selected software platform.

41. The system of claim 26, wherein the updating software further comprises instructions for comparing a planned vehicle route and a route actually followed.

42. The system of claim 26, wherein the updating software further comprises instructions for allowing a user at the base station to remotely control at least one function on the vehicle.

43. The system of claim 26, wherein the system comprises peripheral hardware connected to the communicator for interaction with the base station.

44. A system for tracking and graphically representing the positions of at least one vehicle in a fleet wherein text data relating to the at least one vehicle is bi-directionally linked and dynamically integrated with a graphical representation of the at least one vehicle, comprising:

said at least one vehicle comprising:

a G.P.S. receiver for receiving G.P.S. data; and a data collector coupled to the G.P.S. receiver for collecting the G.P.S. data;

a base station comprising:

a recorder for playing the collected G.P.S. data;

a computer system coupled to the recorder comprising:

a database comprising the text data relating to the at least one vehicle and the graphical representation of the at least one vehicle;

mapping and tracking software for tracking and mapping the position of at least one vehicle on a map;

update software for interacting with the mapping and tracking software, wherein the updating software comprises instructions for updating the text data in the database when the G.P.S. receiver receives G.P.S. data and for updating the graphical representation of the vehicle when the G.P.S. receiver receives G.P.S. data, and interactively communicating with the at least one vehicle;

a display interacting with the mapping and tracking software and for displaying the text data and graphical representation of the at least one vehicle;

a selector interacting with the mapping and tracking software, wherein the update software further comprises instructions for displaying text data from the database when the graphical representation of the at least one vehicle is selected using the selector and the update software displays a graphical representation of a vehicle when text data is selected using the selector;

a communication means to communicate the GPS data from said at least one vehicle to said computer system; and wherein the updating software further contains instructions for identifying preselected words for detection when transmitted in a message of communicated data and for downloading the communicated data associated with the preselected words into separate report databases.

45. The system of claim 44, wherein the database further comprises a vehicle information file and a driver information file.

46. The system of claim 45, wherein the vehicle information file further comprises vehicle identification, make of the vehicle, model of the vehicle, year vehicle was manufactured, the state where the vehicle is registered, type of vehicle, color of vehicle, telephone number at which the vehicle could be reached, a time stamp indicating when the vehicle was assigned to a driver, and a link to the driver information file for providing driver information of the vehicle being driven by the driver.

47. The system of claim 46, wherein the updating software further comprises instructions for generating an alarm when a vehicle speeds or comes to a stop.

48. The system of claim 45, wherein the driver information file further comprises driver identification, driver name, sex of the driver, date of birth for the driver, position of the driver within the company, driver license number, address of the driver, telephone number at which the driver could be reached, and a link to the vehicle information file for providing the vehicle information of the vehicle being driven by the driver.

49. The system of claim 45, wherein the updating software contains instructions for preparing a vehicle maintenance report from the text data in the vehicle information file.

50. The system of claim 44, wherein the database further comprises a schedule file.

51. The system of claim 50, wherein the schedule file further comprises the status and itinerary of at least one vehicle in the fleet.

52. The system of claim 44, wherein the database further comprises a map file having at least one map.

53. The system of claim 52, wherein the at least one map is selected from the group consisting of: raster scanned maps, aerial photographs, and digital maps.

54. The system of claim 44 wherein the updating software contains instructions for comparing a vehicle's actual location with a vehicle's actual destination.

55. The system of claim 44, wherein the updating software further comprises instructions for locating a vehicle closest to an event indicated on the map.

56. The system of claim 44, wherein the updating software further comprises instructions for detecting a transmission error in a sent message and display said message in reverse highlighted text.

57. The system of claim 44, wherein the updating software further comprises instructions for displaying text and graphical data in a report generated in a previously selected software platform.

58. The system of claim 44, wherein the updating software further comprises instructions for comparing a planned vehicle route and a route actually followed.

59. The system of claim 44, wherein the updating software further comprises instructions for allowing a user at the base station to remotely control at least one function on the vehicle.

60. The system of claim 44, wherein the system comprises peripheral hardware connected to the communicator for interaction with the base station.

61. A system for tracking and graphically displaying the positions of vehicles in a fleet comprising a computer system which further comprises:

a database comprising text data relating to a vehicle and graphical representation of the vehicle;

mapping and tracking software for tracking and displaying the position of the at least one vehicle over a map;

update software for interacting with the mapping and tracking software wherein the update software comprises instructions for updating the text data in the database when G.P.S. data relating to the position of a vehicle in the fleet is received, updating the graphical representation of the vehicle in the fleet when the G.P.S. data is received from the vehicles in the fleet, linking the text data and the graphical representation of the vehicle, and interactively communicating with the at least one vehicle;

a display interacting with the mapping and tracking software and for displaying the text data and graphical representation of the vehicle;

a selector for interacting with the mapping and tracking software, wherein the mapping and tracking software further comprises instructions for displaying text data from the database when the graphical representation of a vehicle in the fleet is selected using the selector, and the mapping and tracking software further comprises instructions for displaying the a graphical representation of a vehicle in the fleet when the text data is selected using the selector; and wherein the updating software further contains instructions for identifying preselected words for detection when transmitted in a message of communicated data and for downloading the communicated data associated with the preselected words into separate report databases.

62. The system of claim 61, wherein the database further comprises a vehicle information file and a driver information file.

63. The system of claim 62, wherein the vehicle information file further comprises vehicle identification, make of the vehicle, model of the vehicle, year vehicle was manufactured, the state where the vehicle is registered, type of vehicle, color of vehicle, telephone number at which the vehicle could be reached, a time stamp indicating when the vehicle was assigned to a driver, and a link to the driver information file for providing driver information for the driver of the selected vehicle.

64. The system of claim 63, wherein the driver information file further comprises driver identification, driver name, sex of the driver, date of birth for the driver, position of the driver within company, driver license number, address of the driver, telephone number at which the driver could be reached, and a link to the vehicle information file for providing the vehicle information of the vehicle being driven by the driver.

65. The system of claim 62, wherein the updating software contains instructions for preparing a vehicle maintenance report from the text data in the vehicle information file.

66. The system of claim 63 wherein the updating software further comprises instructions for generating an alarm when a vehicle speeds or comes to a stop.

67. The system of claim 61, wherein the database further comprises a schedule file.

68. The system of claim 67, wherein the schedule file further comprises the status and itinerary of the vehicles in the fleet.

69. The system of claim 61, wherein the database further comprises a map rile having at least one map.

70. The system of claim 69, wherein the at least one map is selected from the group consisting of: raster scanned maps, aerial photographs, and digital maps.

71. The system of claim 61, wherein the update software comprises instructions for determining and recording a vehicle's speed and route based on the G.P.S. data.

72. The system of claim 71, wherein the update software comprises instructions for outputting insurance information relating to the vehicle speed, routes, vehicle information, and driver information.

73. The system of claim 61 wherein the updating software contains instructions to compare a vehicle's actual location with a vehicle's actual destination.

74. The system of claim 61, wherein the updating software further comprises instructions for locating a vehicle closest to an event indicated on the map.

75. The system of claim 61, wherein the updating software further comprises instructions for detecting a transmission error in a sent message and display said message in reverse highlighted text.

76. The system of claim 61, wherein the updating software further comprises instructions for displaying text and graphical data in a report generated in a previously selected software platform.

77. The system of claim 61, wherein the updating software further comprises instructions for comparing a planned vehicle route and a route actually followed.

78. The system of claim 61, wherein the updating software further comprises instructions for allowing a user at the base station to remotely control at least one function on the vehicle.

79. The system of claim 61, wherein the system comprises peripheral hardware connected to the communication for interaction with the base station.

80. The system in claims 1, 26, 44, or 61, wherein the updating software further comprises instructions for displaying text and graphical data in a report generated in a previously selected software platform.

81. A method for dynamically linking and displaying text data and graphical representations of vehicles in a fleet comprising:

receiving G.P.S. data using a G.P.S. receiver on a vehicle in a fleet;

transmitting the G.P.S. data using a communicator to a base station receiver at a base station;

receiving the G.P.S. data at the base station using the base station receiver;

storing the G.P.S. data in a G.P.S. data file on a computer system;

storing driver information in a database on the computer system;

storing vehicle information including a vehicle position from the G.P.S. data in a database on the computer system;

updating the vehicle position as the G.P.S. data is received;

dynamically linking the driver information and vehicle information;

displaying a graphical representation of the vehicle position on a map;

linking the vehicle information including the vehicle position with the driver information;

displaying the driver information and vehicle information as text data upon a user selection on the graphical representation of the vehicle;

updating the vehicle representation in a database using software on the computer system;

linking the text data and the vehicle representation using software on the computer system;

linking the linked text data and vehicle representation using software on the computer system with mapping and tracking software using the software on the computer system;

overlaying the graphical representation of a vehicle over a map;

displaying the text data and graphical representation of a vehicle;

linking interactive communications between a vehicle and a user at the base station, further comprising displaying the text data from the database using software on the computer system when the graphical representation of a vehicle is selected using a selector and displaying the graphical representation of the vehicle using software on the computer system when the text data is selected using the selector; and further comprising using software on the computer system to identify preselected words for detection when transmitted in a message of communicated data and to download the communicated data associated with the preselected words into separate report databases.

82. The method of claim 81, further comprising displaying text and graphical data in a report generated in a previously selected software platform.

* * * * *